(12) United States Patent
Wild

(10) Patent No.: US 6,293,707 B1
(45) Date of Patent: Sep. 25, 2001

(54) PATCH PANEL WITH PIVOTING BRACKET ASSEMBLY

(75) Inventor: Ronald L. Wild, Carmel, IN (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/253,195

(22) Filed: Feb. 19, 1999

(51) Int. Cl.$^7$ ........................................ G02B 6/38
(52) U.S. Cl. ................................................. 385/55
(58) Field of Search ........................ 385/35, 55–60, 385/80–84, 88–90, 147

(56) References Cited

U.S. PATENT DOCUMENTS

| | | | |
|---|---|---|---|
| 4,611,875 | 9/1986 | Clarke et al. | 339/154 |
| 4,944,568 | * 7/1990 | Danbach et al. | 385/88 |
| 5,167,530 | 12/1992 | Wallgren | 439/540 |
| 5,362,254 | 11/1994 | Siemon | 439/536 |
| 5,773,763 | 6/1998 | Stachulla | 174/135 |

* cited by examiner

Primary Examiner—Akm E. Ullah
(74) Attorney, Agent, or Firm—Thomas, Kayden, Horstemeyer & Risley, LLP

(57) ABSTRACT

A patch panel with pivoting bracket assembly is provided which reduces the tendency for optical fiber patch cords to entangle or snarl in front of the couplings of the patch panel. In a preferred embodiment, the patch panel incorporates a plurality of couplings, with each of the couplings configured to optically communicate with an optical fiber cable. Each of the couplings is moveable between a patching position and a stowed position so that, in the patching position, each of the couplings are configured to receive a patch cord connector in a first direction, thereby allowing the patch cord to optically communicate with an optical fiber cable. In the stowed position, the cables of patch cords engaging the couplings are directed toward the mounting surface in a second direction. Preferably, the first direction and the second direction are oriented toward the mounting surface. A method aspect of the invention is also presented.

28 Claims, 19 Drawing Sheets

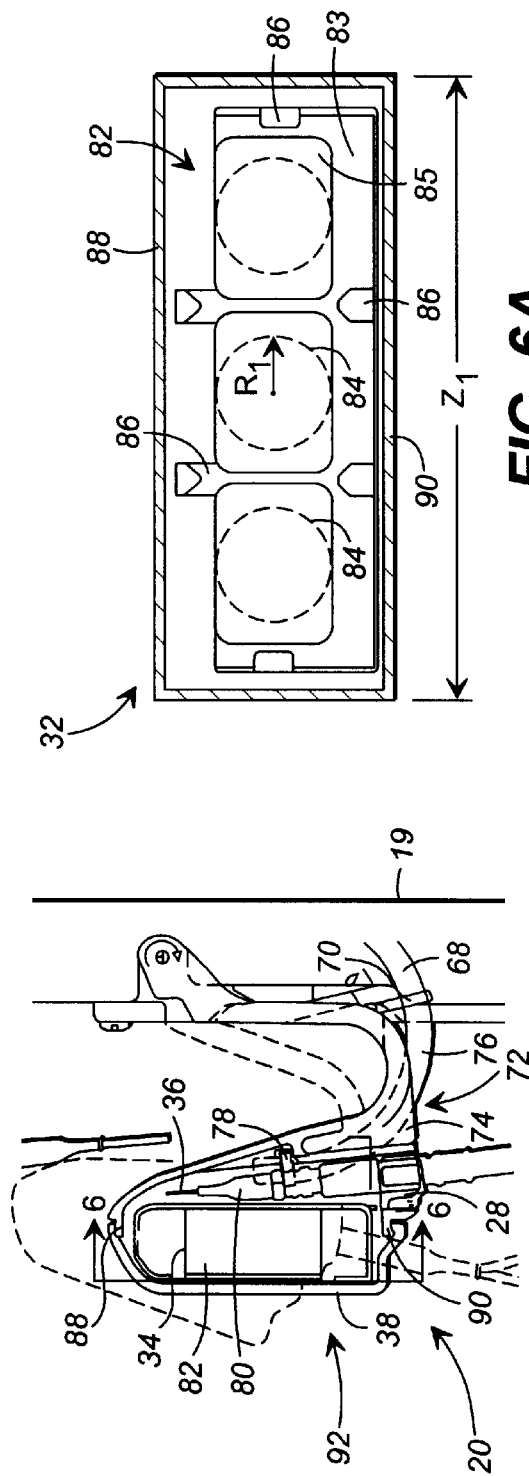
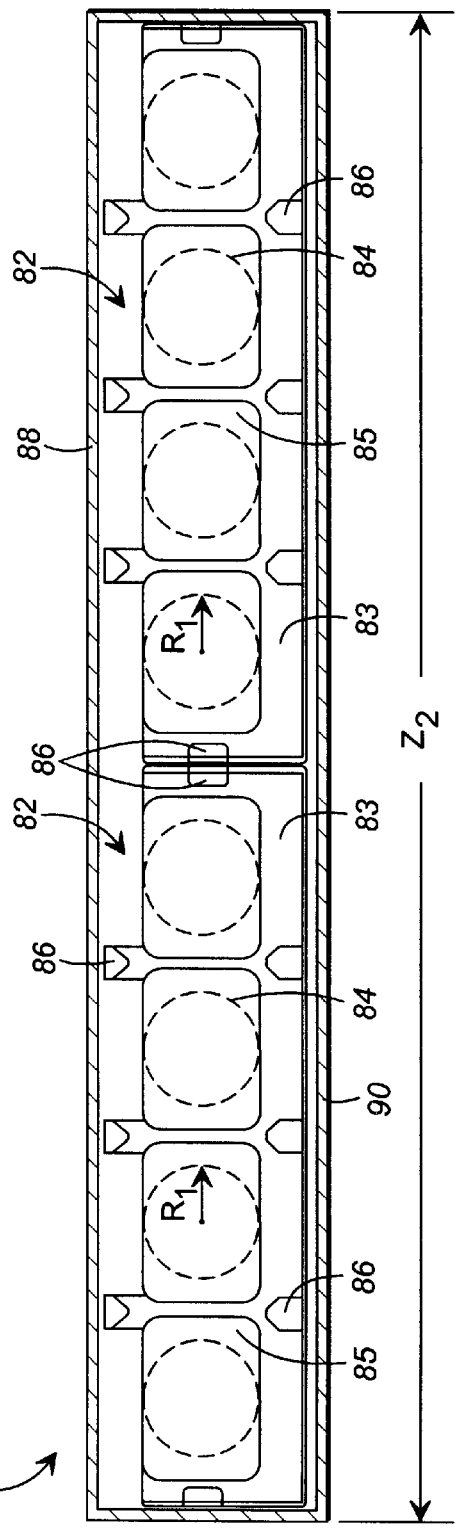

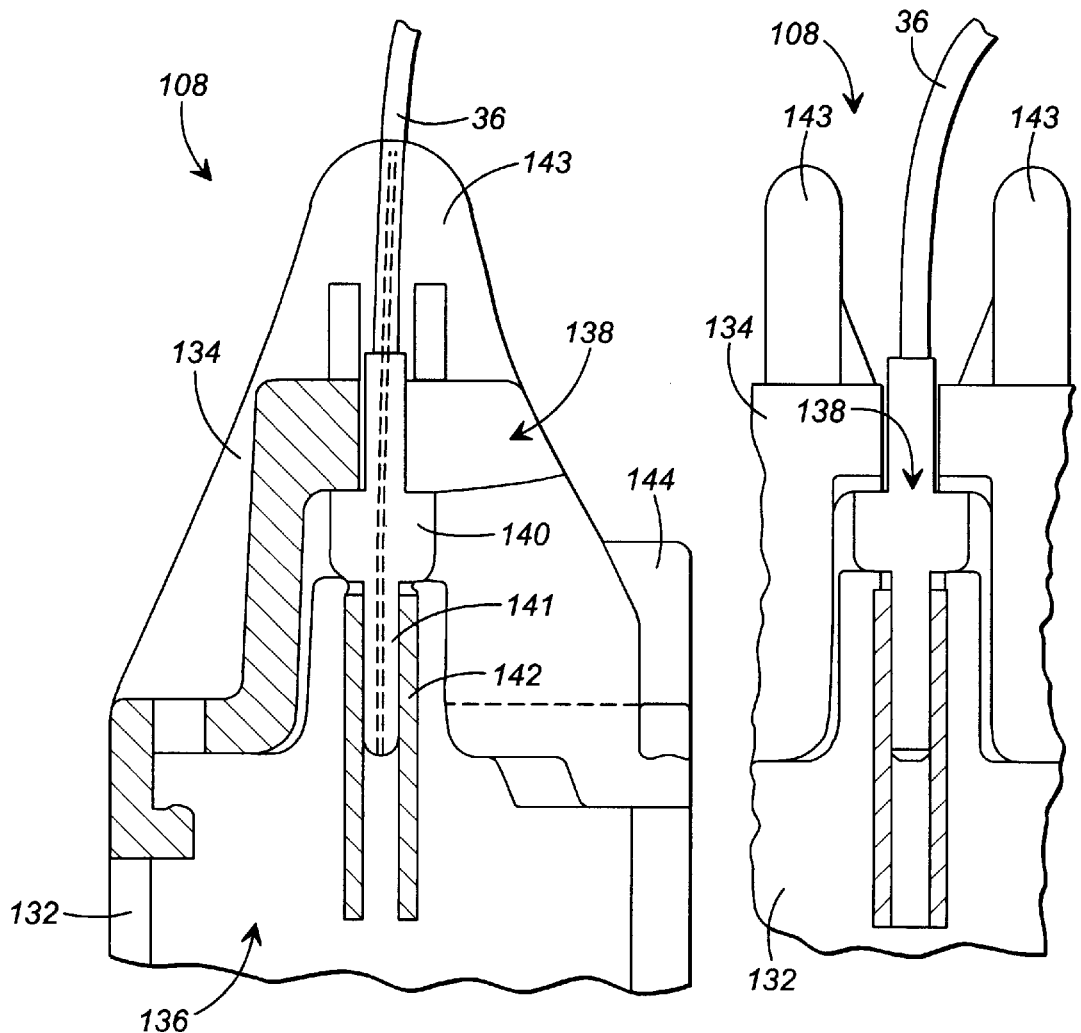
FIG. 10A  FIG. 10B

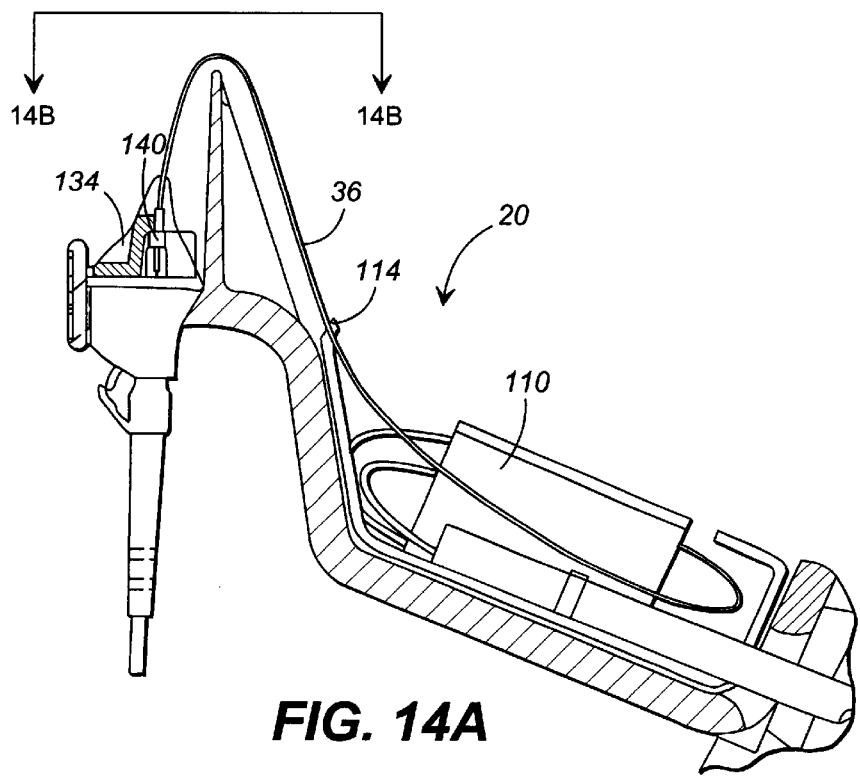
FIG. 14A
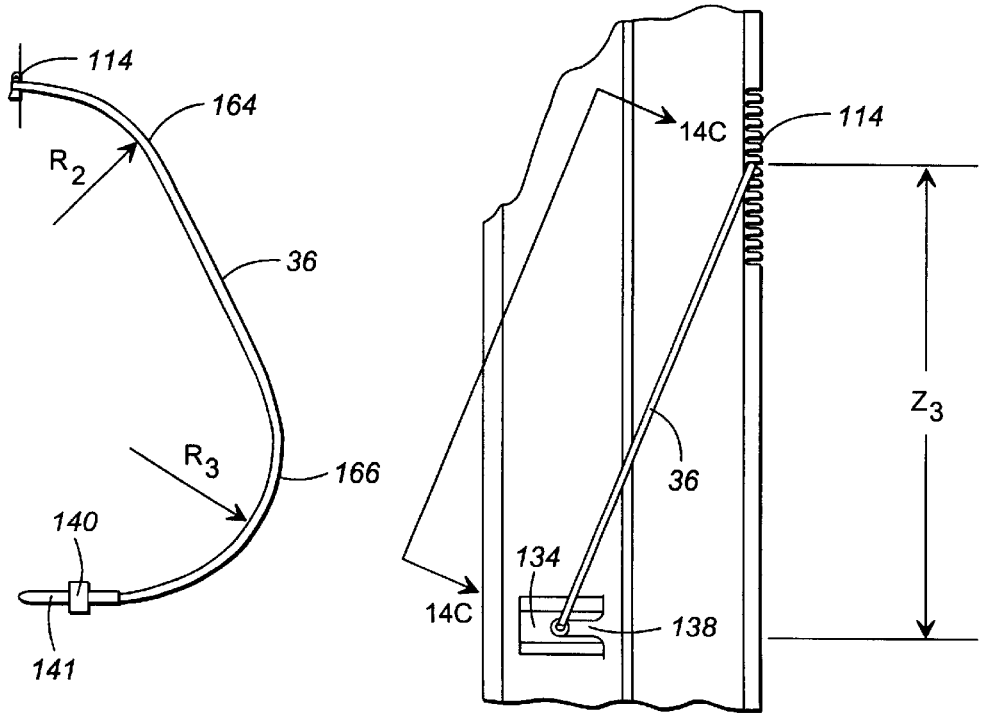
FIG. 14B  FIG. 14C

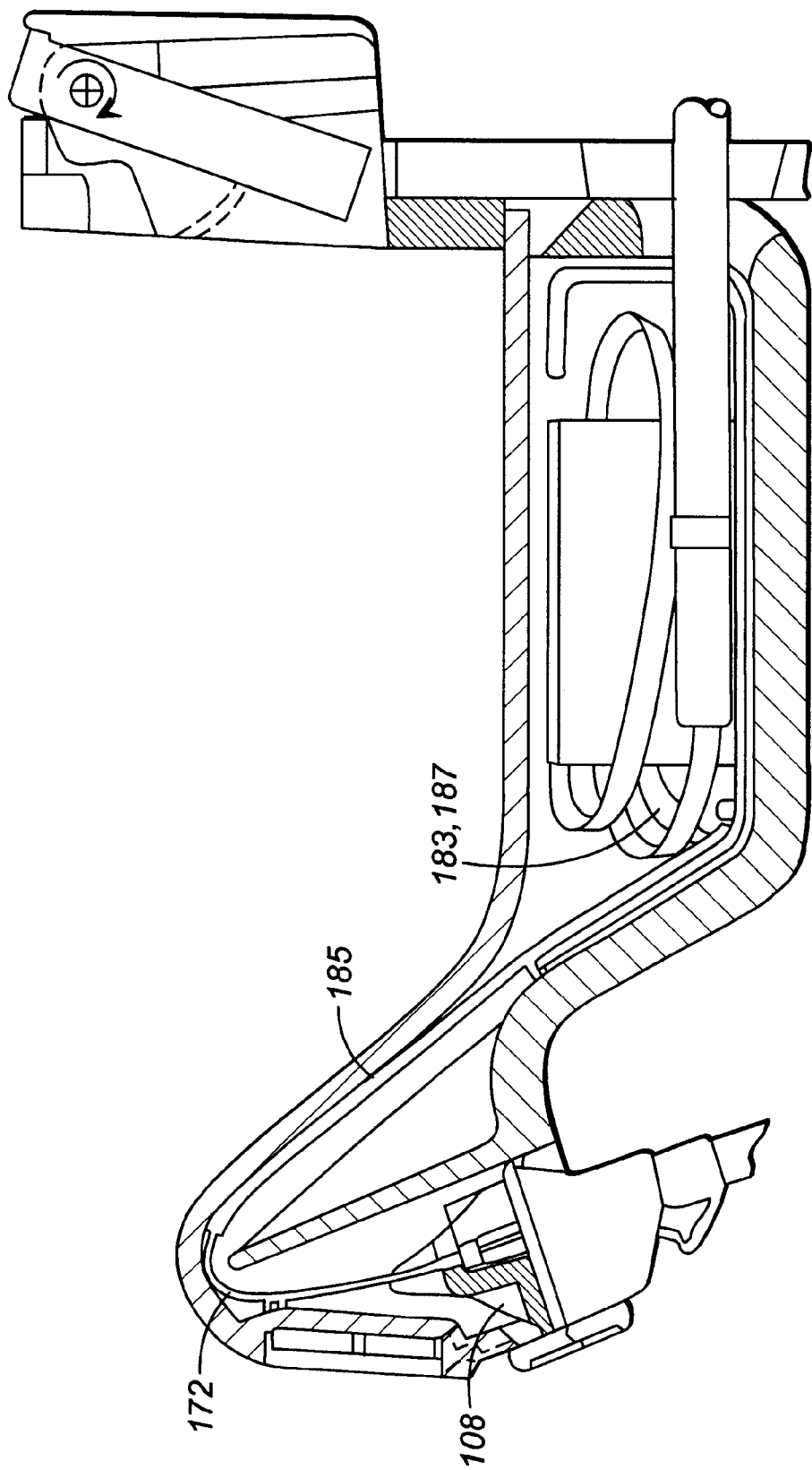

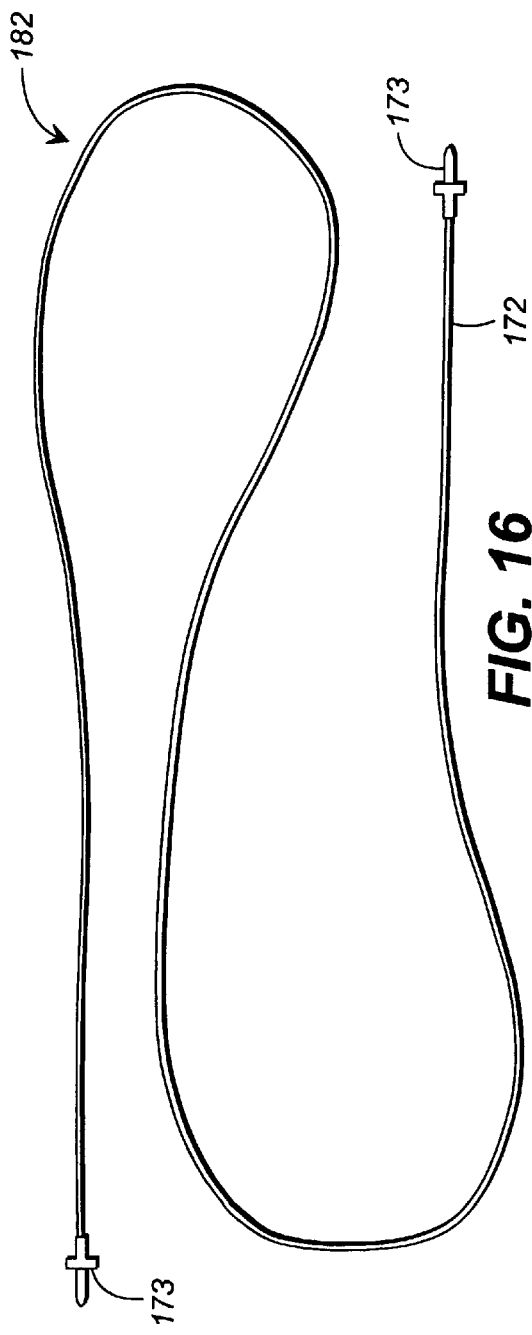
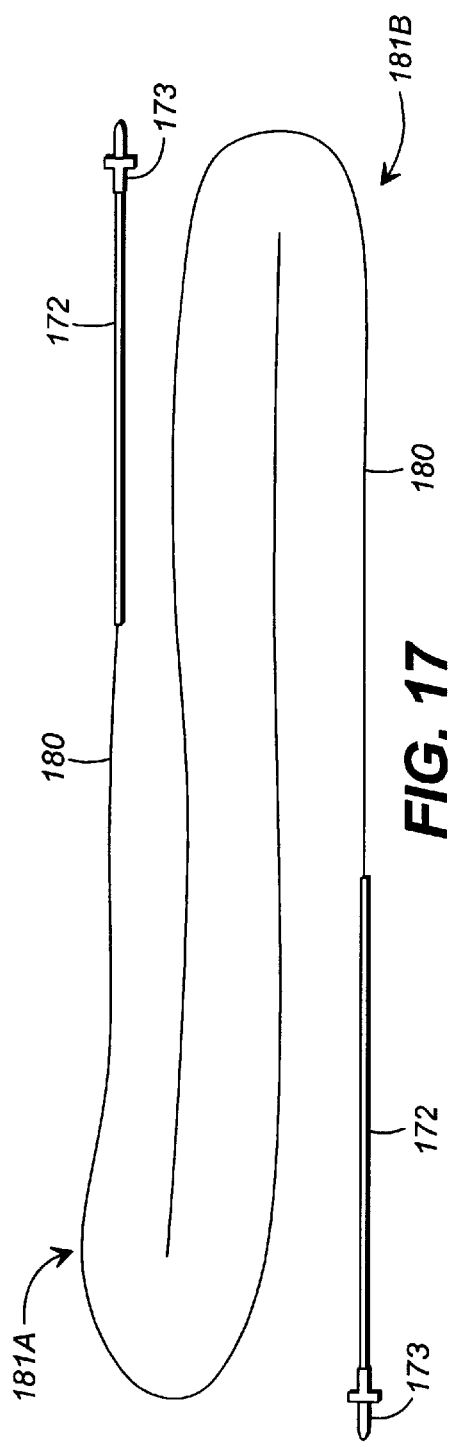

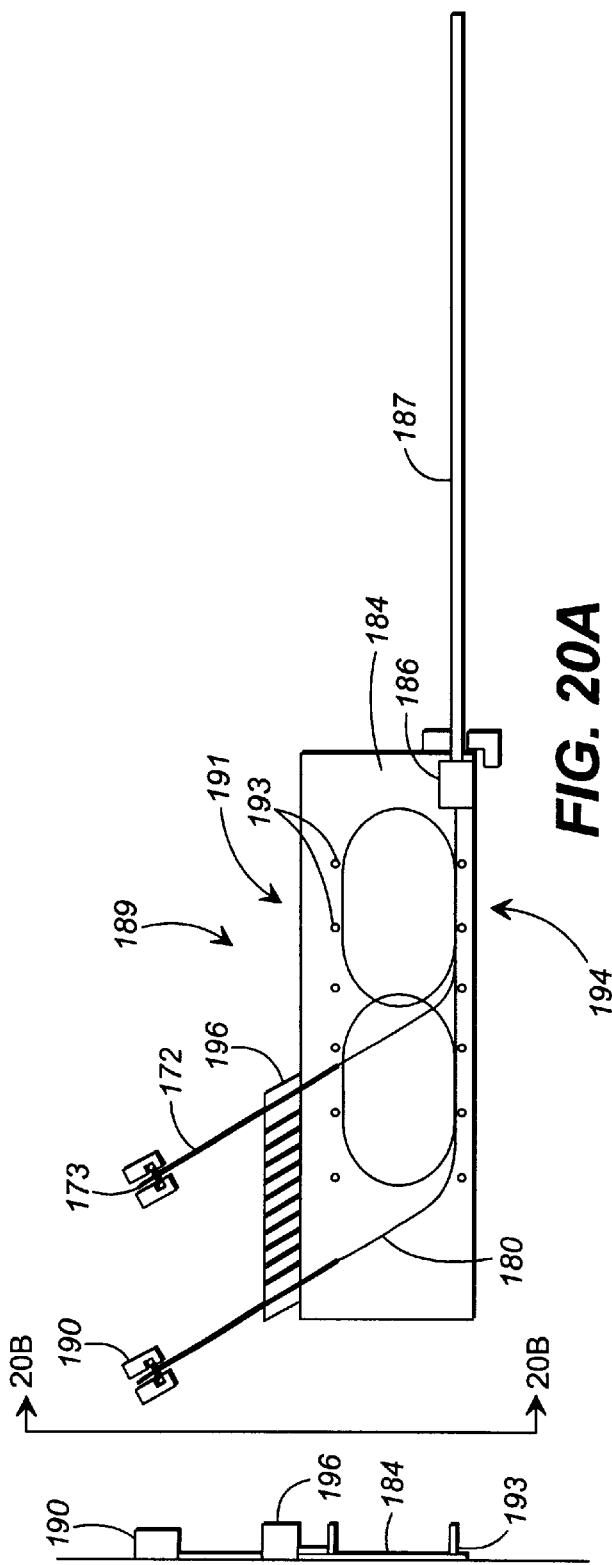
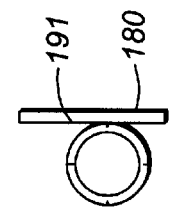
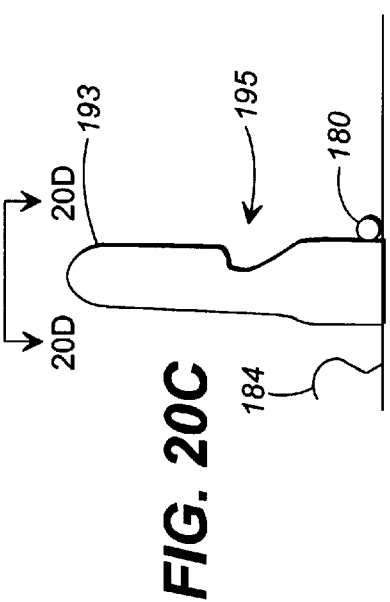
FIG. 20A
FIG. 20B
FIG. 20C
FIG. 20D

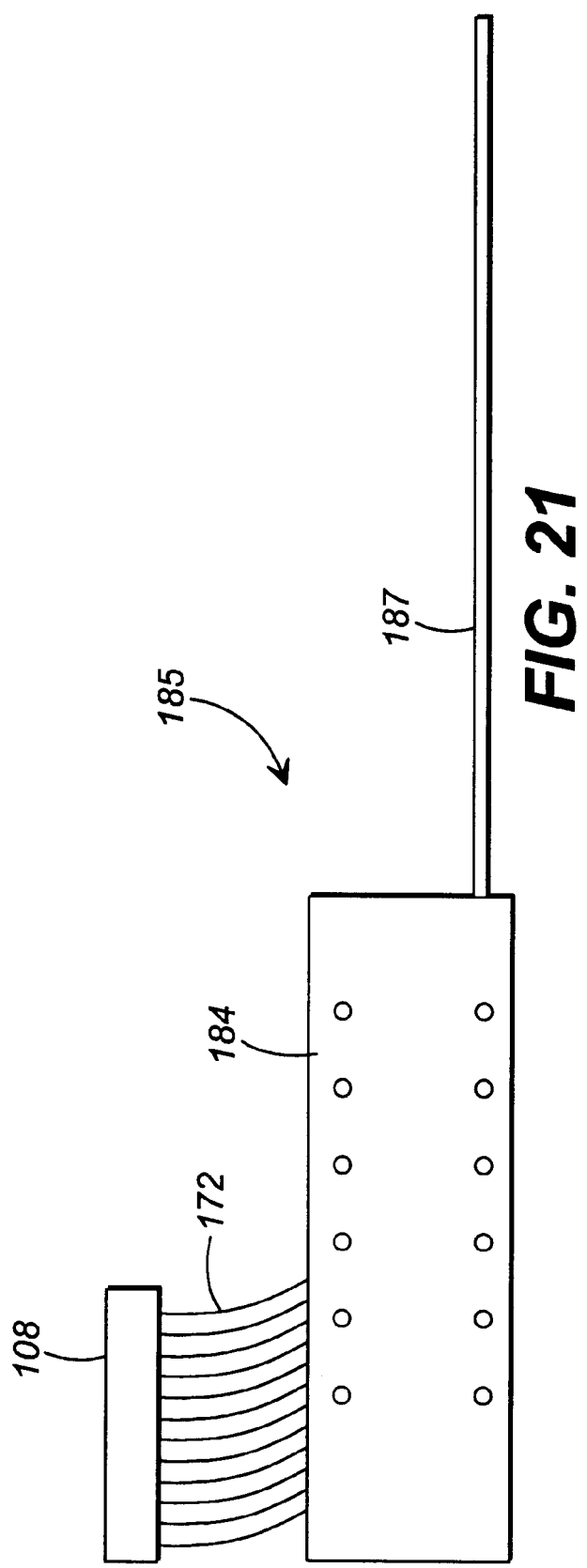

PATCH PANEL WITH PIVOTING BRACKET ASSEMBLY

CROSS-REFERENCE TO RELATED APPLICATIONS

This application addresses shortcomings of the prior art that may also be addressed in U.S. patent application, Ser. No. 09/239,902, filed on Jan. 29, 1999 now is pending.

BACKGROUND OF THE INVENTION

1. Field of the Invention

The present invention relates to patch panels for communications use and, more particularly, to patch panels which incorporate pivoting bracket assemblies that direct optical fiber patch cord cables toward the mounting surfaces to which the patch panels are mounted.

2. Description of the Related Art

In buildings and, more particularly, within communications connection closets in buildings, various transmission media typically are connected to each other and to incoming and outgoing lines by means, such as couplings, which are mounted to patch panels. Patch panels generally are mounted within a communications closet, such as to a wall or other mounting surface, and incorporate a series of couplings for interconnecting the various transmission media. Transmission media, such as buffered optical fibers formed into patch cords, for instance, often incorporate connectors at their ends. These connectors are configured for mating with, for example, the couplings of a patch panel.

Optical couplings come in a variety of types, each having a unique interface designed to mate with an optical fiber connector of like type. One frequently used coupling is referred to as an ST® coupling, which is disclosed, for example, in U.S. Pat. No. 4,934,785 to Mathis et al. ST is a registered trademark of Lucent Technologies, Inc. Another common type of optical fiber coupling is the SC type coupling that is shown and described in U.S. Pat. No. 5,212,752 to Stephenson et al. Other types of optical fiber couplings include the FC type coupling and the LC type coupling. U.S. Pat. No. 5,274,729 to King et al. shows examples of couplings for the ST, SC and the FC types of couplings.

Heretofore, it has been commonplace to orient patch panel couplings within a patch panel so that the couplings face forward, e.g. away from the mounting surface to which the patch panel is mounted. So configured, transmission media connectors, such as the connectors of optical fiber patch cords, typically have an insertion direction for mating with the couplings that is perpendicular with and toward the mounting surface of the patch panel, thereby providing a technician with convenient access for connecting the connectors to and removing the connectors from the various couplings. Since the cable of an optical fiber patch cord typically extends from its connector in a direction which is approximately 180 degrees from its insertion direction, the aforementioned patch panel configuration presents patch cord cables which extend away from the patch panel couplings and the patch panel mounting surface. The patch cords then tend to hang downwardly in front of the patch panel. When carefully dressed, these cords appear neat and orderly and can facilitate efficient patching efforts by a technician, because the patch cords and the patch panel couplings are readily accessible. However, when the patch cords are not carefully dressed, a general appearance of disorder can result as the patch cords inherently tend to form loops in front of the couplings that can be subject to snagging, for example. In extreme cases, the cords may become entangled or snarled with adjacent cords, thereby potentially hindering a technician's patching efforts, plus placing undesirable strains on the cords.

Therefore, there is a need to provide patch panels which address these and other shortcomings of the prior art.

BRIEF SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

The present invention is generally directed to an improved patch panel which reduces the tendency for optical fiber patch cords to entangle or snarl in front of the couplings of the patch panel. In a preferred embodiment, the patch panel incorporates a plurality of couplings, with each of the couplings configured to communicate optically with an optical fiber cable. Each of the couplings is moveable between a patching position and a stowed position by use of a pivoting bracket assembly so that, in the patching position, each of the couplings are configured to receive a patch cord connector in a first direction, thereby allowing the patch cord to optically communicate with an optical fiber cable. In the stowed position, the cables of patch cords engaging the couplings are directed in a second direction. In some embodiments, the first direction and the second direction are oriented toward the mounting surface, while, in other embodiments, the first direction is oriented away from the mounting surface.

In accordance with another aspect of the present invention, a preferred embodiment of the patch panel incorporates first and second bracket assemblies which each include an opening formed therethrough. Jack assemblies are selectively mountable to the bracket assemblies in either a forward-facing configuration or a rear-facing configuration depending on the particular application. In the forward-facing configuration, a jack assembly preferably cooperates with the opening of its bracket assembly to provide a visual indication of being mounted in the forward-facing configuration. Additionally, each of the jack assemblies includes a plug-receiving cavity which cooperates with inclined surfaces of the jack assembly so that a patch cord connector being directed toward engagement with the plug-receiving cavity engages the inclined surfaces and is urged into alignment with the plug-receiving cavity.

In accordance with another aspect of the present invention, the first bracket assembly incorporates a slack tray which is configured to store fibers of an optical fiber cable therein. Preferably, the slack tray is moveable between a retracted position and an extended position so that, in the extended position, access is provided to the couplings for engaging optical fiber cables with and disengaging optical fiber cables from the couplings. Preferably, each of the bracket assemblies includes a lid, with the second bracket assembly forming a slot with its lid when its lid is in a closed position. The slot is adapted to engage a protrusion of the slack tray of the first bracket assembly so that engagement of the protrusion and the slot supports the slack tray in its extended position.

Additionally, a preferred method aspect of the present invention includes: providing a first coupling and a second coupling, with the couplings being oriented in a vertically spaced relationship with each other, the first coupling being moveable between a stowed position and a patching position; moving the first coupling from the stowed position to the patching position and engaging the first coupling with an optical fiber patch cord in a first direction; and, moving the first coupling from the patching position to the stowed position so that the patch cord is directed in a second direction.

The numerous features and advantages of the present invention will be more readily apparent from the following detailed description read in conjunction with the accompanying drawings.

BRIEF DESCRIPTION OF THE SEVERAL VIEWS OF THE DRAWINGS

The accompanying drawings incorporated in and forming a part of the specification, illustrate several aspects of the present invention, and together with the description serve to explain the principles of the invention. In the drawings:

FIG. 5 is a partially cut-away, partially cross-sectional, side view of the present invention, showing detail of the mounting bracket assembly;

FIG. 6A is a partially cut-away, partially cross-sectional view of a preferred embodiment of a slack tray utilized in the representative embodiment of FIG. 5 taken along sectional line 6—6;

FIG. 6B is a partially cut-away, partially cross-sectional view of an alternative embodiment of a slack tray utilized in the representative embodiment of FIG. 5 taken along sectional line 6—6;

FIG. 10A is a partially cut-away, partially cross-sectional view of a preferred embodiment of jack assembly;

FIG. 10B is a partially cut-away, side view of the jack assembly of FIG. 10A;

FIG. 14A is a partially cut-away, partially cross-sectional view of a bracket assembly of the present invention;

FIG. 14B is a top view of the embodiment of FIG. 14A, as viewed from line 14B—14B, showing detail of the fiber offset;

FIG. 14C is a side view of the embodiment of FIG. 14B, as viewed from line 14C—14C, showing detail of the bend radii of the optical fiber;

FIG. 15 is a partially cut-away, partially cross-sectional side view of the present invention showing detail of a fiber fan-out assembly;

FIG. 16 is a top view of a lead assembly;

FIG. 17 is a top view of the lead assembly of FIG. 16 after stripping the loose buffer and cutting the assembly;

FIG. 20A is a top view of an assembly fixture utilized in producing the fan-out assemblies;

FIG. 20B is a side view of the assembly fixture of FIG. 20A;

FIG. 20C is a side view of a pin of the assembly fixture of FIGS. 20A—20B;

FIG. 20D is a top view of the pin of FIG. 20C; and

FIG. 21 is a top view of a fan-out assembly produced in accordance with the method shown in FIGS. 19–20D.

DETAILED DESCRIPTION OF THE PREFERRED EMBODIMENT

Figure 1:
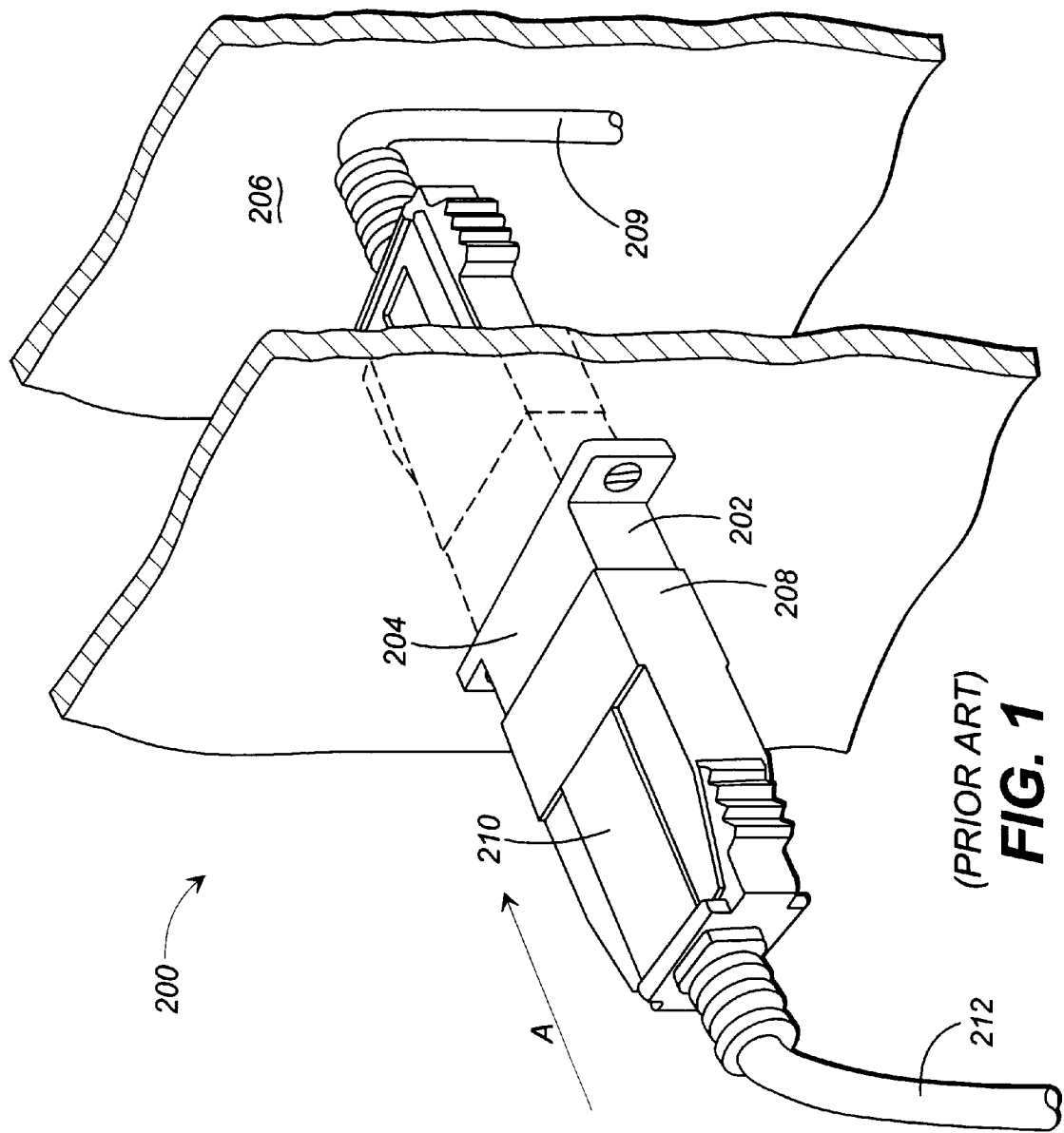
FIG. 1 is a partially cut-away, partially exploded, perspective view of a prior art patch panel, showing detail of a coupling and patch cord connector.

Reference will now be made in detail to the description of the invention as illustrated in the drawings, wherein like reference numbers indicate like parts throughout the several views. FIG. 1 shows a representative portion of a typical prior art patch panel 200. Prior art patch panel 200 incorporates a plurality of couplings 202 (one of such couplings being shown in FIG. 1) for interconnecting a series of transmission media, such as optical fiber cables. Coupling 202 is arranged within its panel 200 so that its connector-receiving end 204 faces away from patch panel mounting surface 206, i.e. a wall, thereby allowing laser light emitted from uncovered and/or unused couplings to be directed away from the mounting surface and, undesirably, toward a technician. End 204 is adapted to engage the front end 208 of a connector 210 when front end 208 engages end 204 in direction A, thereby optically interconnecting line cable 209 to the optical fiber cable 212 of the patch cord. So configured, cable 212 extends away from its connector 210 and away from mounting surface 206 (e.g. in a direction opposite to that of the insertion direction A) when connector 210 engages the connector-receiving end 204 of coupling 202.

As described hereinabove, the cables 212 of adjacent patch cords which are connected to a prior art patch panel may become entangled as the cables extend in front of and hang below their respective couplings. Thus, the prior art patch panel 200 may reduce the efficiency of a technician while the technician attempts to perform patching functions and, otherwise, can tend to create a possible snagging situation as well as a disorderly appearance if the patch cords are not properly dressed.

Figure 2:
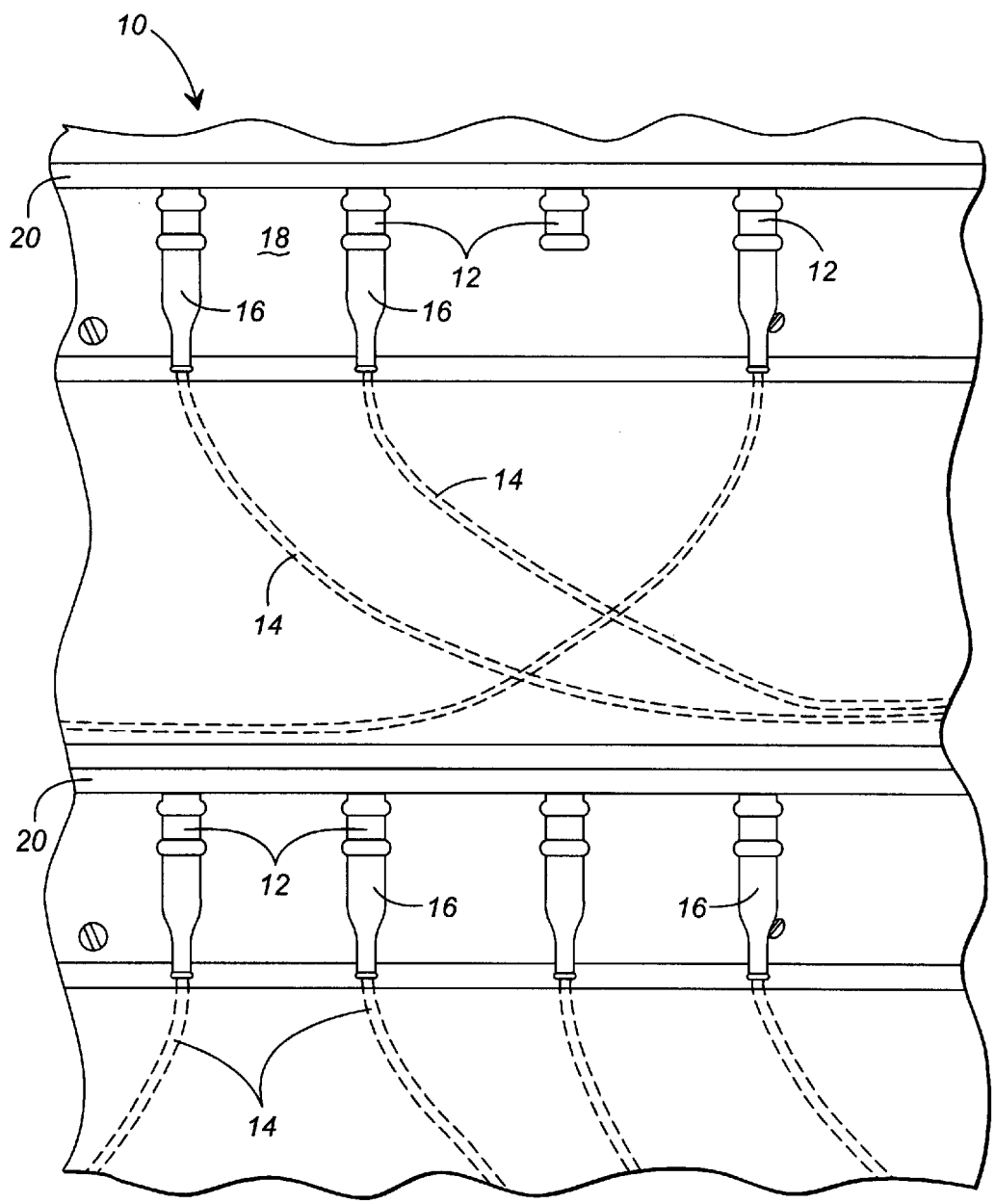
FIG. 2 is a partially cut-away, front view of a preferred embodiment of the patch panel of the present invention.
Figure 3:
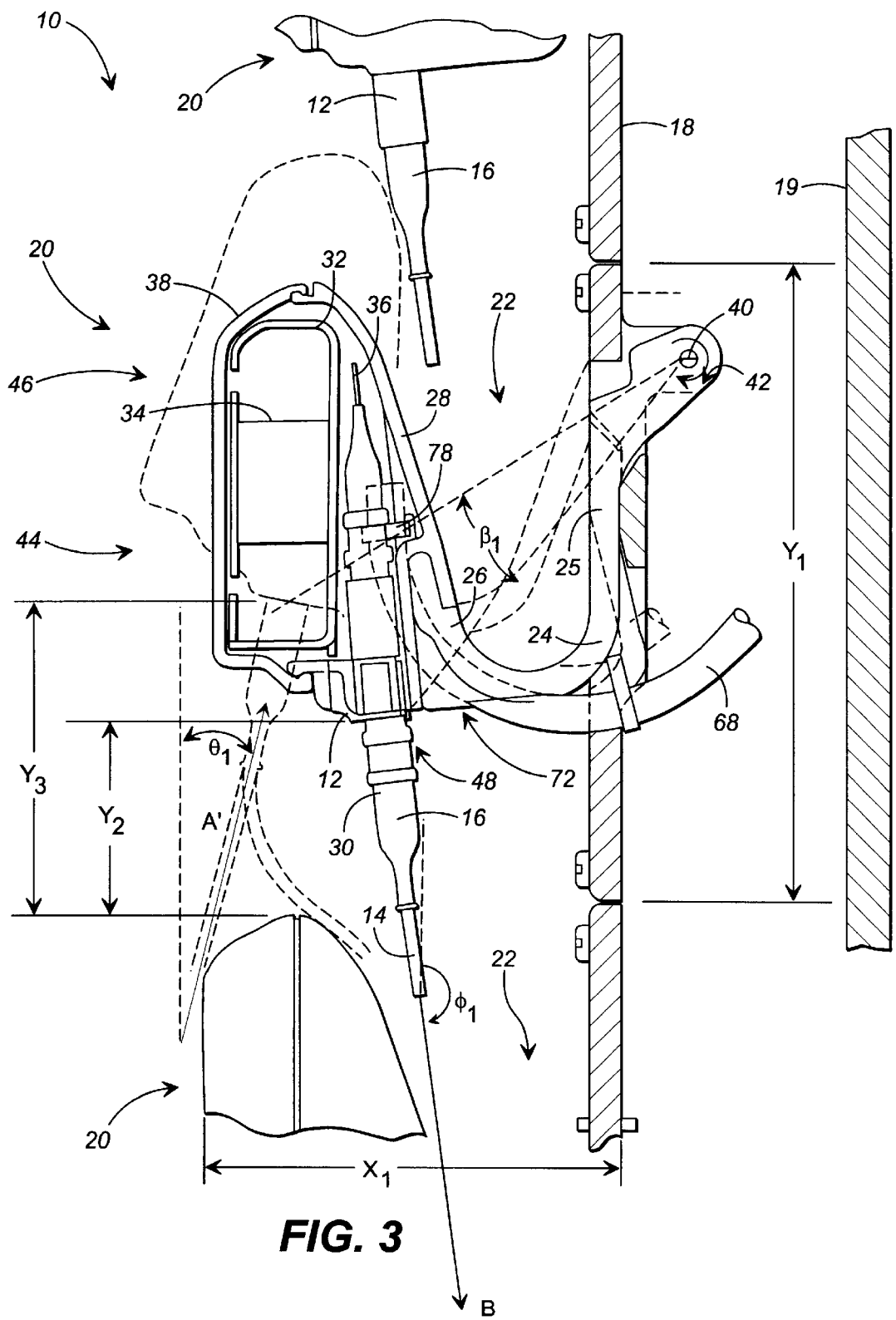
FIG. 3 is a partially cut-away, cross-sectional view of the embodiment of FIG. 2.

As shown in FIGS. 2 and 3, a preferred embodiment of the patch panel 10 of the present invention incorporates a series of couplings 12 which are configured to direct the cables 14 of their respective optical fiber patch cords 16 toward the mounting surface of the patch panel 10. Patch panel 10 includes a back panel 18, which can be a conventional 110 style back panel, among others, and one or more mounting bracket assemblies 20 attached to the back panel. The back panel is attached to a mounting surface 19 by any suitable means, including, for example, mechanical fasteners, such as screws, bolts, rivets, etc.

Each mounting assembly 20 incorporates one or more couplings 12, with the couplings preferably arranged in a side-by-side relationship across the width of each bracket assembly. Typically, each bracket assembly 20 extends a length ($X_1$) of approximately 3.375 inches from the back panel, although various other lengths can be utilized depending on the particular application. For patch panels 10 incorporating more than one bracket assembly 20, the brackets generally are spaced vertically from each other in order to form a space or raceway 22 between the upper surface of the lower bracket assembly 20 and the lower surface of the upper bracket assembly 20 for accommodating the passage of cables therethrough. A vertical spacing ($Y_1$) of approximately 5.25 inches (3U) has been found suitable for typical applications.

Bracket assembly 20 incorporates a bracket member 24 which, when viewed from one of its ends, preferably is configured as a J-shaped member which includes a base portion 25 and an extended portion 26. A coupling frame 28 is mounted at the distal end of extended portion 26 and provides one or more couplings 12. Frame 28 preferably is oriented so that the couplings are directed downwardly for receiving the connectors 30 of patch cords 16 generally in an upward direction. Adjacent couplings 12, each frame 28 mounts a slack tray 32 (described in greater detail hereinafter) which provides one or more spools 34 for providing strain relief to optical fibers 36 wound thereon. A lid 38 is provided for covering the slack tray, thereby protecting optical fibers 36 stored therein when the lid is in a closed position. The lid is selectively is removable from the closed position in order to provide access to fibers 36, such as during repair operations.

As shown in greater detail in FIG. 3, each bracket assembly 20 preferably is pivotally attached to its back panel 18 by use of a pivot pin 40 which is inserted through a corresponding hole 42 in the bracket member, thereby allowing the bracket assembly to pivot between a stowed position 44 and a patching position 46. In its patching position 46, represented by phantom lines in FIG. 3, connector-receiving cavity 48 of coupling 12 is presented so that the connector 30 of an optical fiber patch cord 16 can engage the coupling by being inserted into the connector-receiving cavity in connector-insertion direction A'. The angle ($\theta_1$) formed between connector-insertion direction A' and back panel 18, or alternatively, the angle ($\theta_1$) formed between connector-insertion direction A' and either mounting surface 19 or a vertical plane, is between approximately 0 and approximately 90 degrees, preferably between approximately 10 and approximately 30 degrees, and most preferably approximately 20 degrees. So configured, by pivoting the bracket assembly upwardly through an angle ($\beta_1$), i.e. approximately 30 degrees, from the stowed position to the patching position, the patching space ($Y_2$) between the coupling and the upper most surface of the bracket assembly located therebelow is increased, e.g. to $Y_3$, thereby making it easier for a technician to perform patching operations.

After inserting a connector into coupling 12, bracket assembly 20 can be lowered to its stowed position 44, thereby directing the cable 14 of the patched patch cord away from its coupling, e.g. in direction B, and into raceway 22. The angle ($\phi_1$) formed between direction B and back panel 18, or alternatively, the angle ($\phi_1$) formed between formed between direction B and either mounting surface 19 or a vertical plane, is between approximately 90 and approximately 180 degrees, preferably between 160 and approximately 180 degrees, and most preferably approximately 170 degrees.

Figure 4B:
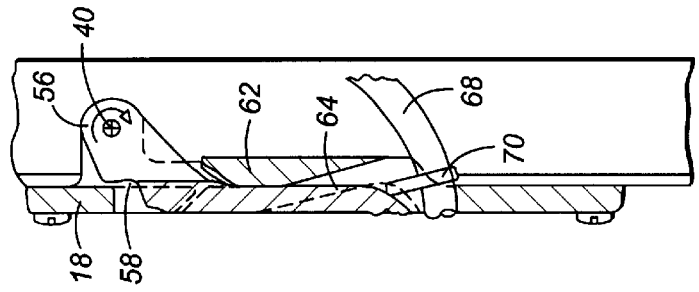
FIG. 4B is a partially cut-away, cross-sectional, side view of the embodiment of FIG. 4A taken along section line 4B—4B.
Figure 4A:
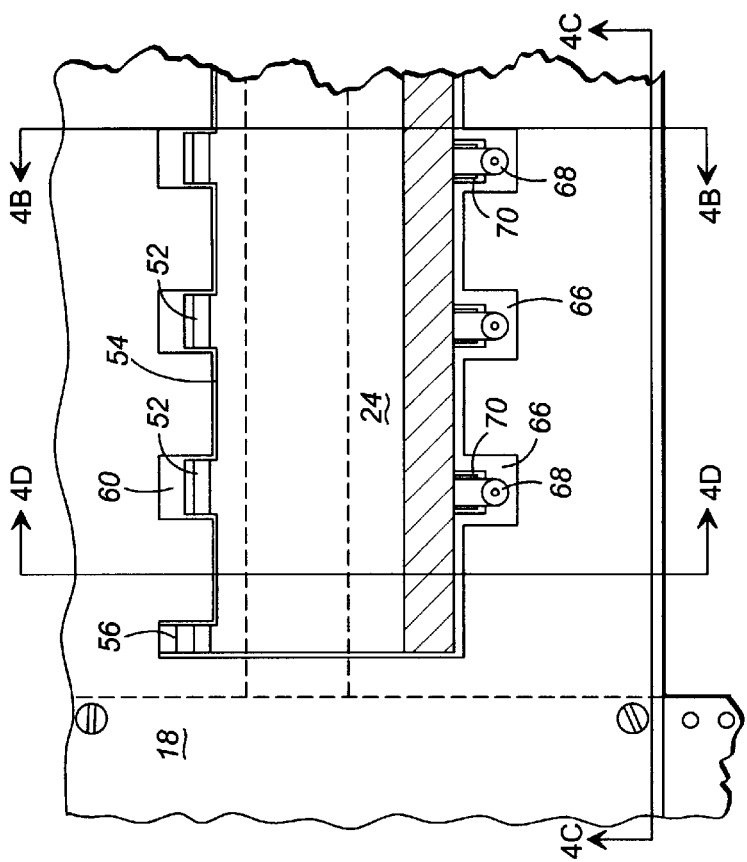
FIG. 4A is a partially cut-away, front view of a representative portion of the patch panel of FIGS. 2 and 3, showing detail of the bracket member.
Figure 4C:
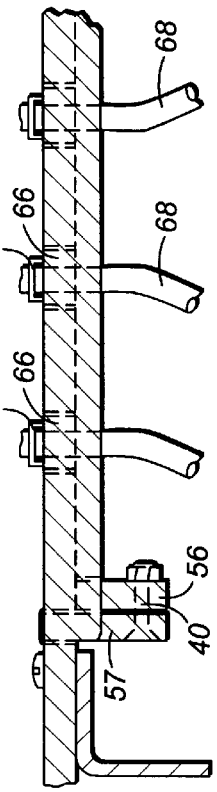
FIG. 4C is a partially cut-away, cross-sectional, bottom view of the embodiment of FIG. 4A taken along section line 4C–4C.
Figure 4D:
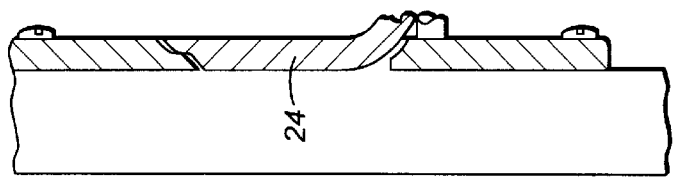
FIG. 4D is a partially cut-away, cross-sectional, side view of the embodiment of FIG. 4A taken along sectional line 4D–4D.

Referring now to FIGS. 4A–4D, the configuration of bracket assembly 20 will be described (in FIGS. 4A–4D, extended portion 26 of the bracket member has been removed for clarity). As shown in FIG. 4A, bracket member 24 is configured, as viewed from its front, with a rectangular shape. Bracket member 24 includes a series of tabs 52 extending from its upper edge 54, with the tabs arranged in a spaced relationship from each other. Additionally, the upper edge includes a pivot arm 56 extending from each of its ends that cooperate with the tabs to form a hinge. Each pivot arm has a hole 42 formed therethrough that receives a pivot pin 40 extending from an anchor 57 of the back panel so that the bracket assembly 20 can pivot about the pivot pins between the aforementioned stowed position and patching position. So configured, the tabs prevent patch cords from being pinched by bracket member 24 as the bracket is pivoted. Each pivot arm 56 preferably includes a notch 58 formed in its upper surface which is configured to engage a portion of the back panel. So configured, as the bracket assembly is rotated from the stowed position to the patching position, the notch engages the back panel, thereby limiting the upward rotation of the assembly 20 and, thus, establishes the orientation of the patching position.

Each bracket assembly 20 is adapted to engage a bracket-receiving cutout 60 of a back panel. A back stop 62 of the back panel is adapted to engage a rear surface 64 of the bracket member so that cooperation of back stop 62 against rear surface 64 assists in retaining the bracket member in its stowed position. The bracket-receiving cutouts preferably incorporate cable orifices 66 which are provided so that line cables 68 can extend from the rear of back panel 18 to the front of the panel. Cable orifices 66 are sized and shaped so that a cable 68, which is attached to the lower surface of its bracket member, is able to move freely through the orifice without damaging the fibers of the cable. In order to facilitate ease of movement of the cable through its orifice, cable support brackets 70 preferably are provided for securing the cable to the bracket member at a location near the cable orifice.

Typically, line cable 68 (FIGS. 3 and 5) extends from mounting surface 18 and enters the rear of patch panel 10. Cable 68 then extends through cable orifice 66 and enters a cable channel 72 formed on a lower surface of bracket member 24. Cable channel 72 preferably is formed by spaced side walls 74 which direct the cable toward slack tray 32. Typically, jacket 76 of cable 68 terminates prior to entering the slack tray, thereby allowing optical fibers 36 carried within the jacket to extend beyond the terminated end of the jacket and into the slack tray. In a preferred embodiment, a cable terminating bracket 78 is provided at the distal end of bracket member 24 to support the terminated end of the jacketed cable. So configured, optical fibers 36 of cable 68 extend from the terminated end and enter the slack tray 32. Typically, each fiber terminates in a cable connector 80 (described in greater detail hereinafter) which is adapted to cooperate with a coupling 12.

As shown in greater detail in FIGS. 5–7, slack tray 32 houses one or more fiber winding assemblies 82. Each of the assemblies 82 incorporates spools 34 that offer strain relief to optical fibers 36 which are particularly vulnerable to being damaged when stripped of their jacket 76. Each spool 34 extends from a base 83 and provides a curved spooling surface 84 upon which fibers 36 can be wound. The radius ($R_1$) of spooling surface 84 is appropriately chosen to satisfy any minimum bend radius requirements of the fibers 36. End caps 85 also are provided for maintaining the fibers about the spools. As shown in the embodiment of FIG. 6A, a preferred embodiment of the fiber winding assembly includes three spools and is configured for cooperating with a slack tray having a width ($Z_1$) of approximately 8.5 inches. As shown in the embodiment of FIG. 6B, however, the fiber winding assembly includes four spools and is configured to cooperate with an additional winding assembly with the assemblies typically abutting each other in an end-to-end relationship. So configured, the end-abutting assemblies provide strain relief to fibers wound within slack trays having a width ($Z_2$) of approximately 19 inches. Additionally, retainers 86 extend from the periphery of base 83 to maintain the fibers within the slack tray. Preferably, each retainer 86 extends outwardly in the vicinity of the spaces formed between adjacent spools.

Figure 7A:
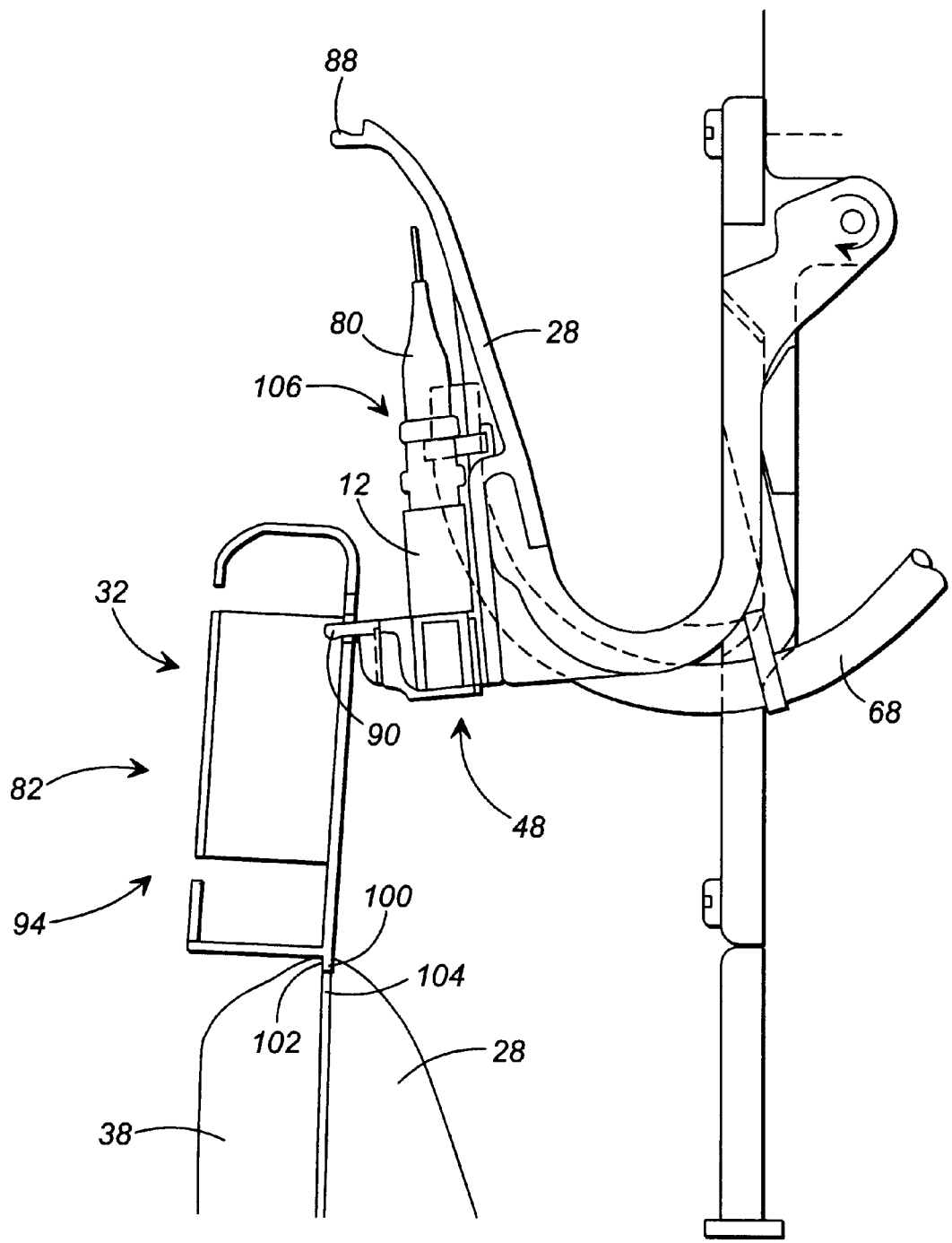
FIG. 7 is a partially cut-away, cross-sectional, side view of an embodiment of the patch panel showing detail of the slack tray moved to its extended position.

Fiber winding assembly 82 (FIGS. 3 and 5) preferably is retained in its retracted position by a snap detent formed into adjacent walls of the winding assembly 82 and bracket assembly 20. Lid 38 is provided for covering slack tray 32 when in its retracted position. Preferred embodiments of lid 38 engage bracket assembly 20 at edges 88 and 90 of frame 28, thereby covering the slack tray when the lid is attached to edges 88 and 90. Additionally, when the lid is removed, access to cable connectors 80 is provided by moving the slack tray from its retracted position 92 (FIG. 5) to its extended position 94 (FIG. 7A). The slack tray also can incorporate a protrusion 100, preferably formed as a ridge oriented along lower edge 102, which cooperates with a complimentary shaped recess 104, preferably formed as a slot oriented between the lid 38 and frame 28 of a bracket assembly 20 arranged therebelow, so that the slack tray is maintained in its extended position by engaging the protrusion within the recess.

In an alternative embodiment (FIG. 7B), slack tray 32 is moveable between its retracted and extended positions by utilizing a crank 105 which rotatably engages both bracket assembly 20 and the slack tray. Preferably, the crank is formed of a C-shaped segment of wire which engages the slack tray at each of its ends. So configured, the orientation of the slack tray may be adjusted by pivoting the slack tray relative to the crank as the crank is pivoted outwardly and downwardly through an arc from the retracted position (shown in phantom lines) to the extended position.

Figure 7B:
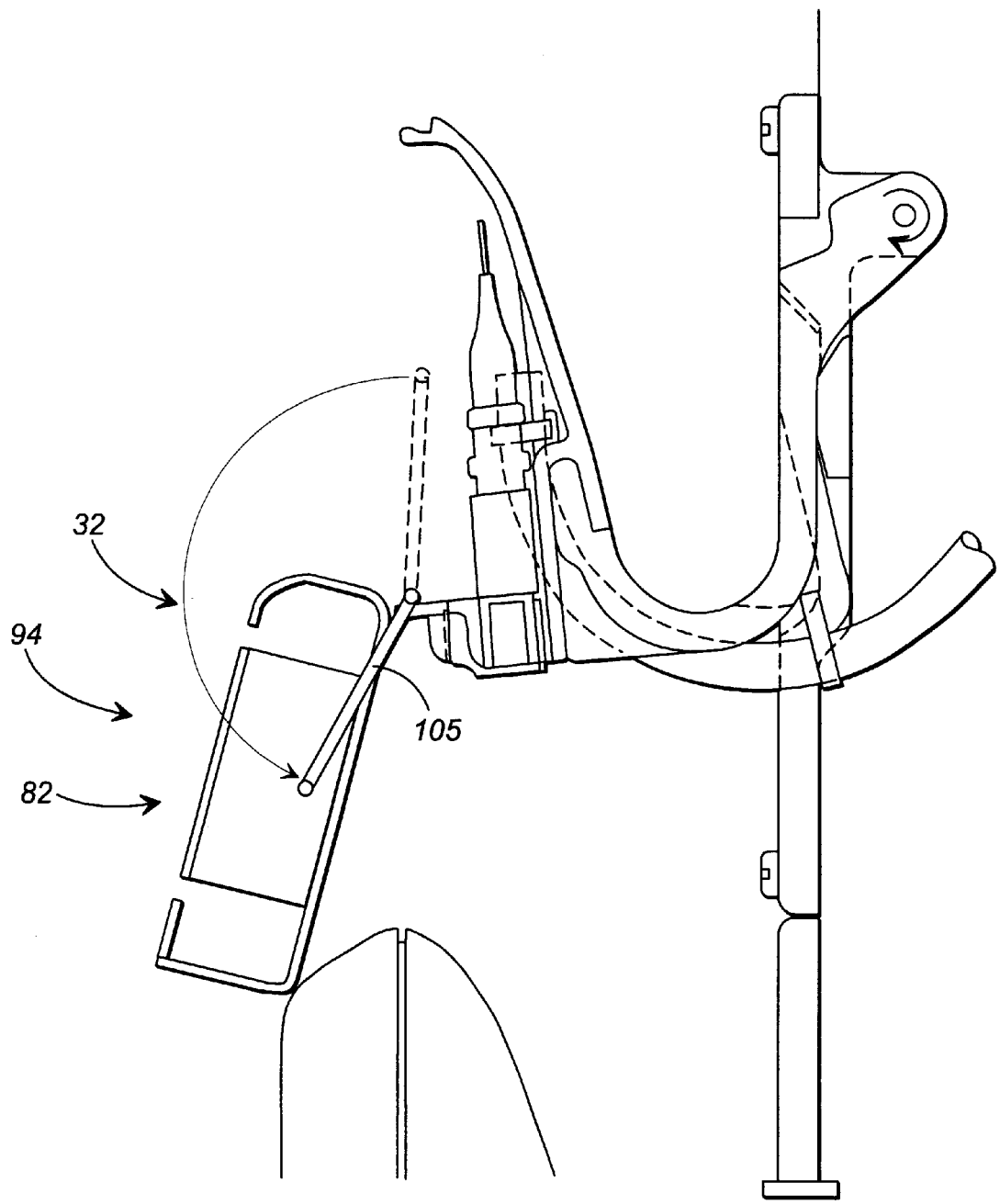

Each cable 68 typically terminates in a plurality of cable connector 80 (as described hereinbefore) which are adapted to engage within the cable-receiving cavity 106 of coupling 12. During repair operations, for instance, engagement of cable connector 80 within cable-receiving cavity 106 typically is facilitated by removing lid 38 from bracket assembly 20 and then moving slack tray 32 to its extended position (FIGS. 7A and 7B). Once moved to the extended position, the cable-receiving cavity is conveniently presented to a technician so that the cable connector can be removed, repaired and then reinserted within the cable-receiving cavity. The slack tray then is replaced to its retracted position by pivoting the slack tray with crank 105 until the snap detent is engaged, thereby constraining the slack tray in the retracted position. The lid is then reattached. The bracket assembly then can be pivoted from its stowed position to its patching position, such as by pivoting the bracket assembly through angle ($\beta_1$), thereby conveniently presenting the connector-receiving cavities 48 to the technician so that the connectors of patch cords can be inserted within the desired connector-receiving cavities. After patching, the bracket assembly is then lowered to its stowed position. So configured, the patch panel 10 provides an improved fiber patching density over the prior art, while allowing laser light exiting from unused and uncovered couplings to be directed away from a technician and, in preferred embodiments, toward the mounting surface.

Figure 8:
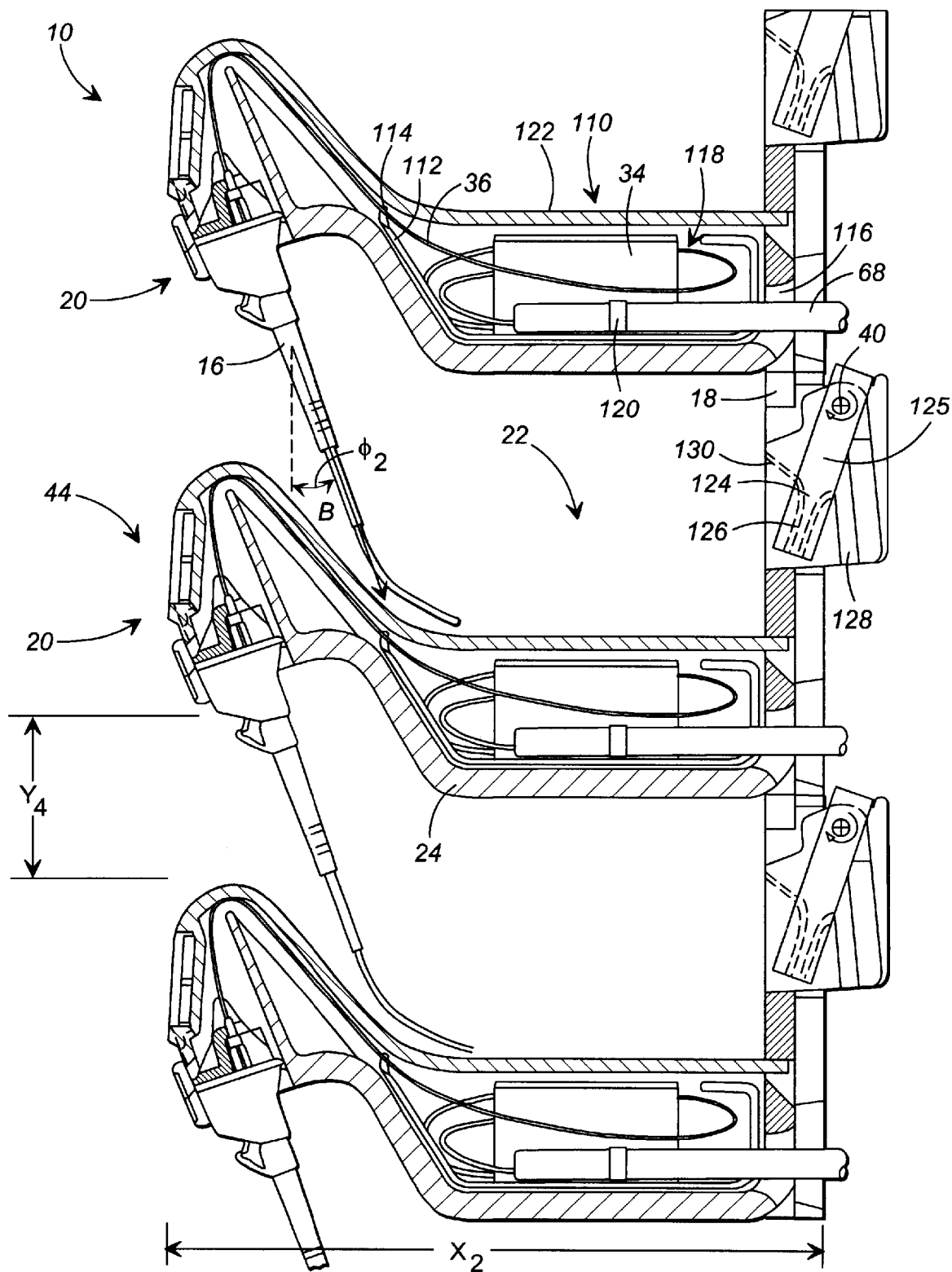
FIG. 8 is a partially cut-away, cross-sectional view of an alternative embodiment of the present invention.
Figure 9:
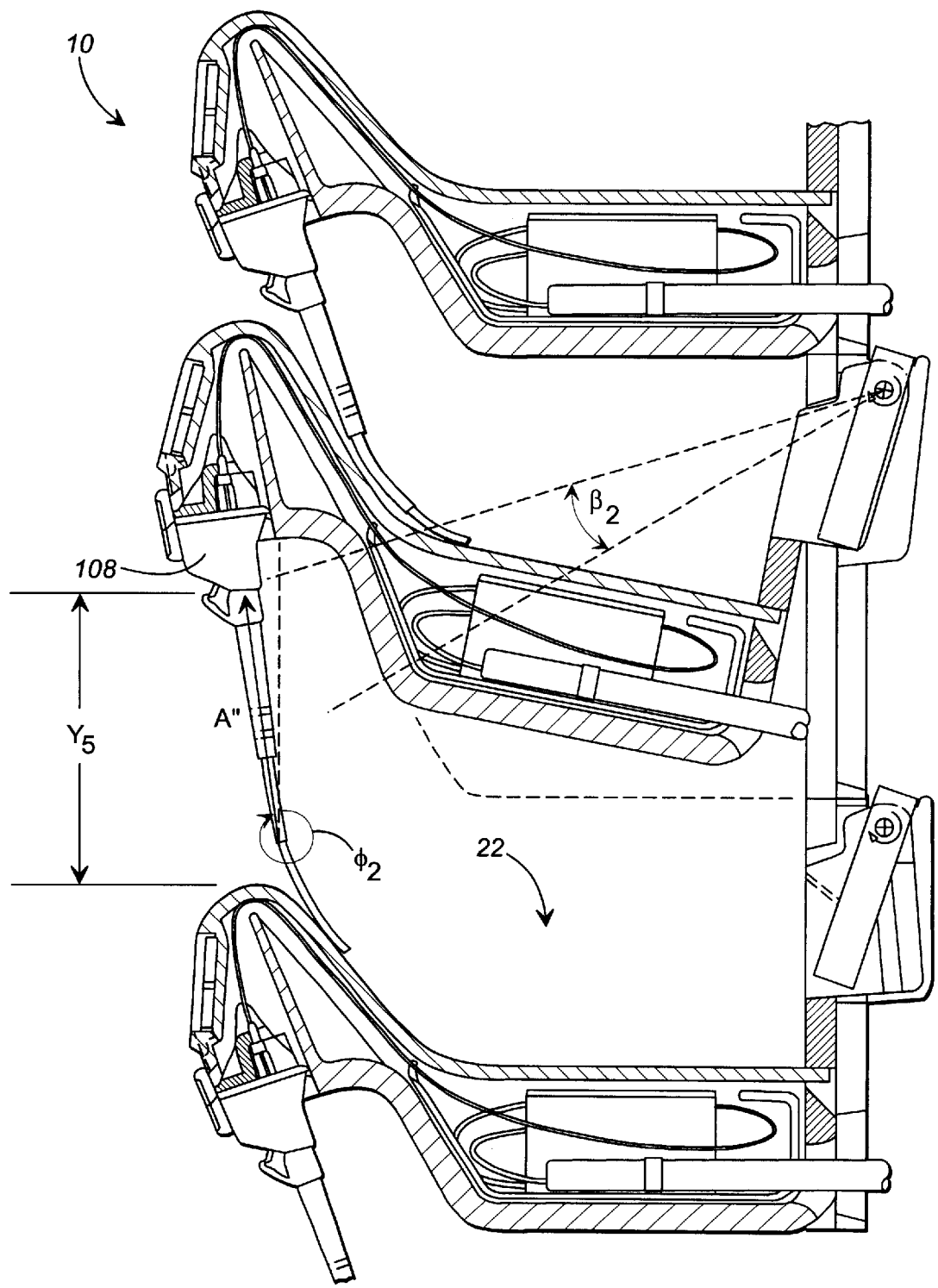
FIG. 9 is a partially cut-away, cross-sectional view of the embodiment of FIG. 8 showing detail of a bracket assembly pivoted to its patching position.

As shown in FIG. 8, an alternative embodiment of patch panel 10 is provided. Each bracket member 24 is pivotally attached to its back panel by a pivot pin 40, which allows the bracket member to pivot between its stowed position 44 and its patching position 46 (FIG. 9). Each bracket member supports a jack assembly 108 and a slack tray 110, with the slack tray oriented between jack assembly 108 and back panel 18. Each slack tray incorporates one or more spools 34 for winding fibers 36 thereon. At its distal end 1 12, the slack tray preferably incorporates a comb 114, described in greater detail hereinafter, for securing the position of a fiber 36 as the fiber is directed from its line cable 68 to its jack assembly 108. Line cable 68 typically enters bracket member 24 through a cable orifice 116 and terminates within fiber stowage area 118 of the bracket member. A cable bracket 120 also can be provided for securing the terminated end of the cable. Additionally, a removable cover 122 is provided which, in its attached position extends over and covers the fiber stowage area 118, thereby protecting the fibers stored therein.

Each bracket member is selectively retained in its patching position by a spring 124 which preferably is configured as a U-shaped band, although other configurations can be utilized. Each spring 124 includes arms 125 which are biased toward each other. Each arm 125 incorporates an inwardly extending protruding portion 126 which is adapted to engage a complementary shaped recess 128 formed at a side 130 of each bracket member 24. By rotating the bracket member to its patching position (as shown in FIG. 9), protrusions 126 are received within the recesses 128 with a sufficient biasing force to maintain the bracket member in its patching position until a technician overcomes the spring biasing force by urging the bracket member downwardly to its stowed position. By referring to FIGS. 8 and 9, it can be seen that the spacing $Y_4$ between adjacent bracket members when the brackets are in their stowed positions is increased significantly, e.g., to a spacing $Y_5$, when the upper bracket is rotated through an angle ($\beta_2$) to its patching position. So configured, an increased patch cord density can be accommodated while providing a technician with convenient access to the jack assembly for performing patching operations.

In the embodiment of FIG. 9, an angle ($\theta_2$) is formed between insertion direction A" and the back panel or, alternatively, between insertion direction A" and either the mounting surface or a vertical plane, when the bracket assembly is in its patching position. The angle ($\theta_2$) is between approximately 180 and approximately 360 degrees, preferably between approximately 270 and approximately 350 degrees, and most preferably approximately 340 degrees. So configured, laser light emitted from uncovered and/or unused couplings is directed toward the mounting surface (preferably into raceway 22) and, therefore, away from a technician. Since this configuration of the jack assembly and, in particular, the orientation of the insertion direction A" can make it difficult for a technician to perform patching operations, preferred embodiments of the jack assembly incorporate features, described in detail hereinafter, which allow the technician to efficiently perform the patching operations even though the plug-receiving cavity of the jack assembly may not be visible to the technician.

As shown in FIGS. 10A and 10B, a preferred embodiment of jack assembly 108 incorporates a jack frame 132 and one or more retainer caps 134. Each jack frame 132 provides one or more plug-receiving cavities 136 with each of the cavities being configured to receive the connector or plug 30 of a patch cord 16. Preferably, retainer cap 134 snap fastens to jack frame 132 with the retainer cap incorporating a fiber-receiving channel 138 which is configured to receive the barrel 140 of a terminated fiber 36, so that a fiber and its ferrule 141 can properly align within alignment sleeve 142 of the retainer cap. Ribs 143 extend from the retainer cap to protect the terminated fibers 36, while providing a surface against which a technician may push when installing and/or removing the retainer cap. In the embodiment of FIGS. 10A and 10B, the jack assembly also incorporates an indicator rib 144 (described in detail hereinafter).

Figure 11B:
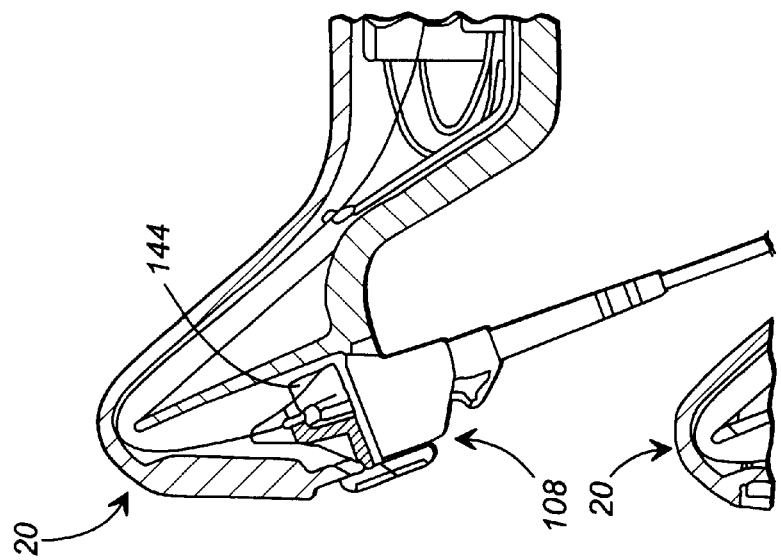
FIG. 11B is a partially cut-away, partially cross-sectional side view of the embodiment of FIG. 11A.
Figure 11A:
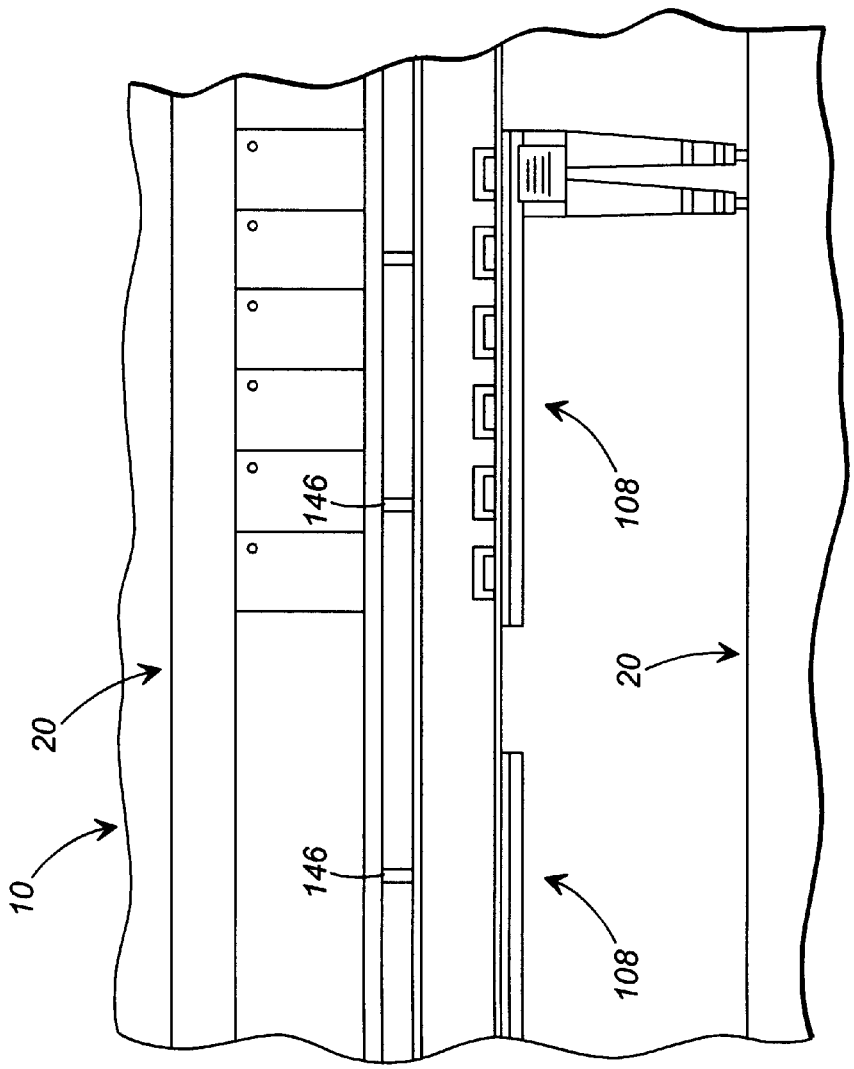
FIG. 11A is a partially cut-away, front view of the embodiment of FIG. 8.
Figure 12:
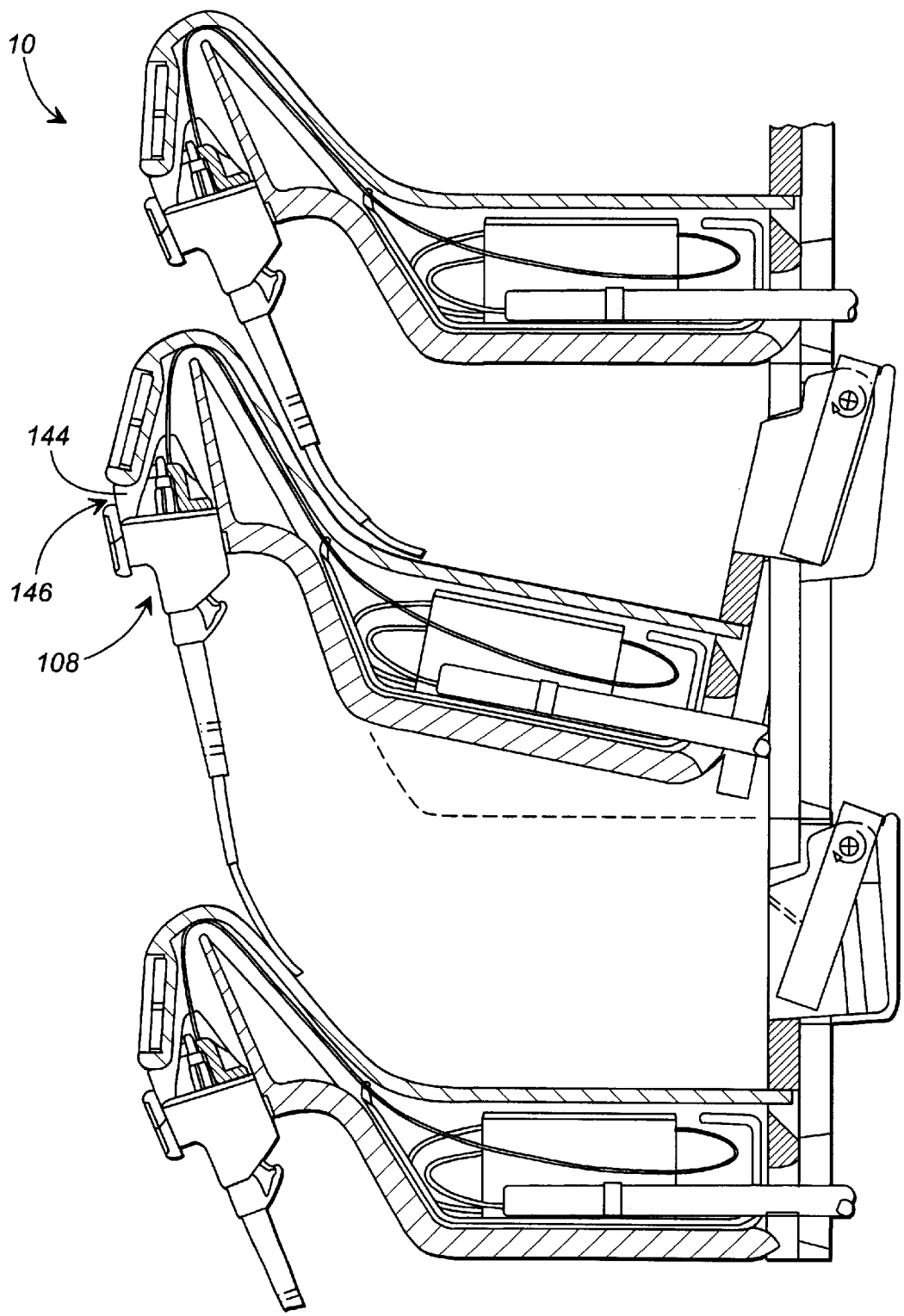
FIG. 12 is a partially cut-away, partially cross-sectional view of an alternative embodiment of the present invention.

Referring now to FIGS. 11A and 11B, the function of indicator rib 144 will be described. As shown in FIG. 11A, each bracket assembly 20 incorporates one or more visual indicator openings 146. Preferably, openings 146 are slots that are oriented so as to be readily viewable by a technician performing patching operations. As jack assembly 108 is attached to its bracket assembly 20, indicator rib 144 does not appear within opening 146 when the jack assembly is oriented in a forward-facing arrangement, such as shown in FIG. 11B. When, however, jack assembly orientation is reversed, such as in a rear-facing arrangement shown in FIG. 12, the indicator rib 144 fills the opening 146, thus becoming viewable by a technician. So configured, a technician can determine the orientation of the jack assembly 108, i.e., forward-facing or rear-facing, by viewing the visual indicator opening. Preferably, visual indicator rib 144 incorporates an easily distinguishable color scheme so that when the indicator rib is present within opening 146, a rapid visual determination of the orientation of jack assembly 108 can be made by the technician. This configuration is particularly useful since the jack assemblies typically are attached on a lower side of their respective bracket assembly and typically are at least partially obscured from view. Other variations of this visual indication system also can be adapted to provide a technician with a visual indication of the orientation of jack assemblies, such variations can include mounting indicator rib 144 so that the rib appears within opening 146 when in the forward-facing arrangement, providing the jack assembly with a protrusion which extends through the opening, etc.

Figure 13B:
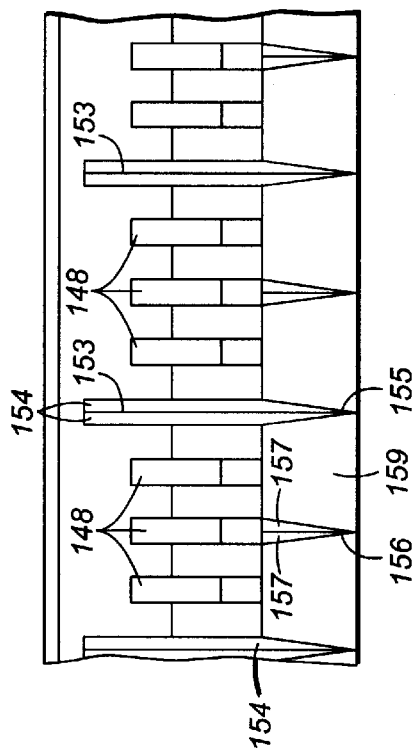
FIG. 13B is a side view of the jack assembly of FIG. 13A, as viewed from line 13B—13B with the patch cord removed.
Figure 13C:
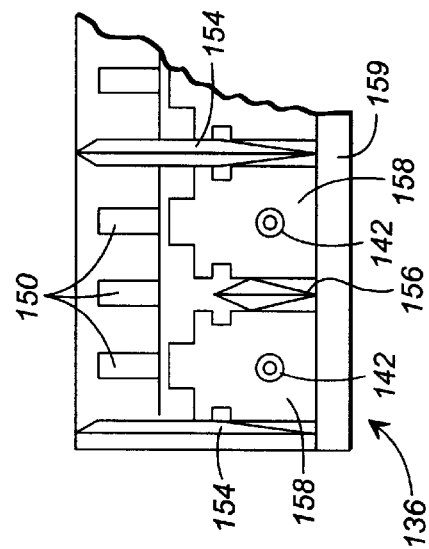
FIG. 13C is a bottom view of the jack assembly of FIGS. 13A, as viewed from line 13C—13C with the patch cord removed.
Figure 13A:
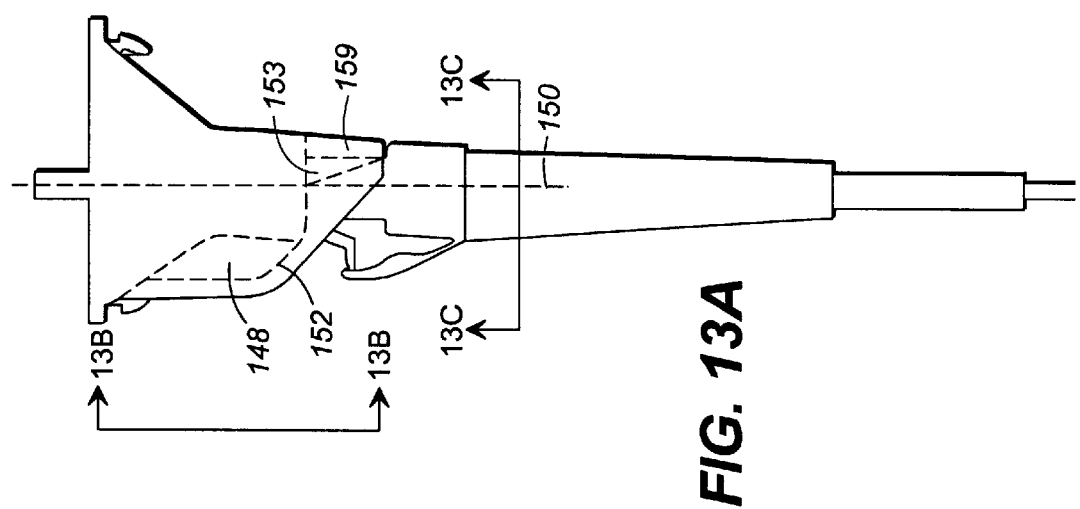
FIG. 13A is a side view of a preferred embodiment of the jack assembly, with a representative patch cord attached thereto.
Figure 18:
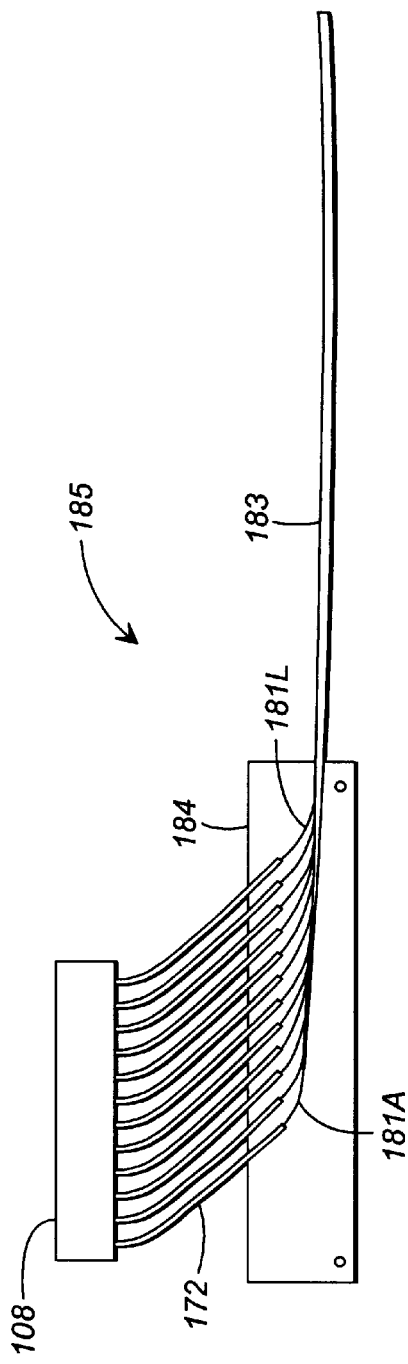
FIG. 18 is a top view of a preferred embodiment of a fan-out assembly.

Due to the aforementioned difficulty of a technician being able to visually locate the plug-receiving cavities 136 of a jack assembly 108, a series of lead-in ribs are provided, in preferred embodiments, that direct the plugs of patch cords toward engagement with the plug-receiving cavities. As shown in FIGS. 13A–13C, jack assembly 108 incorporates at least one plug-receiving cavity 136. Adjacent each cavity, at least one centerline lead-in rib 148 is provided for directing the plug of a patch cord toward centerline 150 of the cavity. The centerline lead-in rib incorporates an inclined surface 152 which is adapted to engage a front portion of a plug, thereby allowing a technician to engage the plug against the inclined surface and then draw the plug along the inclined surface toward the center of the cavity. Fences 153 are disposed between each plug-receiving cavity 136 and include inwardly inclined surfaces 154 which are configured to orient a patch plug laterally into alignment with the plug-receiving cavity. Additionally, each fence 153 incorporates a tapered end 155. Thus, as a plug engages centerline lead-in rib 148 and is directed toward the center of a plug-receiving cavity, fences 153 ensure that lateral alignment of the plug is maintained. A lead-in rib 156 is provided, such as in duplex plug-receiving embodiments (ie. FIGS. 13A–13C), and includes inclined surfaces 157 which are configured in a tapered arrangement to orient a plug laterally into alignment with the plug-receiving cavity. Once so aligned, lead-in rib 156 engages the plug between individual duplex plug-receiving cavities 158 with each of the connectors of the duplex plug oriented on a side of lead-in rib 156. Additionally, lead-in ribs 156 and fences 153 cooperate with a backstop wall 159 which is adapted to prevent a plug from passing beyond centerline 150 during insertion of the plug into the cavity. So configured, ribs 148 and 156, fences 153 and backstop wall 159 cooperate to align a plug as a technician attempts to patch the plug within the plug-receiving cavity of the jack assembly.

Referring now to FIGS. 14A–14C, preferred orientation of an optical fiber within a bracket assembly 20 will be described. As shown in FIGS. 14A–14C, a fiber 36 extends from slack tray 110 toward jack assembly 134. Typically, each fiber 36 terminates in a barrel 140 which has a ferrule 160 extending therefrom. As fiber 36 extends from the slack tray, the fiber is re-directed approximately 180 degrees, so that it may properly seat within and cooperate with its jack assembly. In order that the fiber is not bent through an improperly small radius of turn, which could damage the fiber or cause transmission loss, the fiber is directed through comb 114 as it departs the slack tray. Comb 114 is adapted to retain fiber 36 at an approximately three inch lateral offset ($Z_3$) from fiber-receiving channel 138 of the jack assembly. As shown in FIG. 14C, the aforementioned arrangement provides the required minimum bend radius to the optical fiber and, in particular, preferably provides a first bend 164 with a radius $R_2$ of approximately one inch and a second bend 166 with a radius $R_3$ of approximately one inch.

As shown in FIGS. 15–18, a preferred embodiment of a multi-fiber preterminated fan-out assembly 185 to be used with the present invention incorporates a plurality of fiber lead assemblies 181. Use of the fan-out assembly 185 reduces patch panel installation time by interconnecting twelve fibers at a time using a ribbonized fiber cable pig-tail 183. This allows the use of mass fiber fusion splicing, mass fiber mechanical splicing, or mass fiber connectors. FIG. 16 shows a lead assembly 182 using loose buffered fiber 17 terminated on both ends. The loose buffer is extruded over 250 micrometer diameter coated fiber in a continuous manufacturing process. The terminated lead assembly 182 is tested to assure acceptable transmission loss. Lead assembly 182 is then cut at its center and stripped to create two lead assemblies 181A and 181B, shown in FIG. 17. After stripping the loose buffer, a length of the 250 micrometer diameter fiber 180 is exposed. Twelve of these lead assemblies, e.g. 181A through 181L, are assembled into the fan-out assembly 185 using a 12-wide jack assembly 108 and two pieces of tape 184 to laminate the fan-out into a predetermined geometry. The individual fibers 180 are then ribbonized in a known manner to form a fiber ribbon cable 187.

Figure 19:
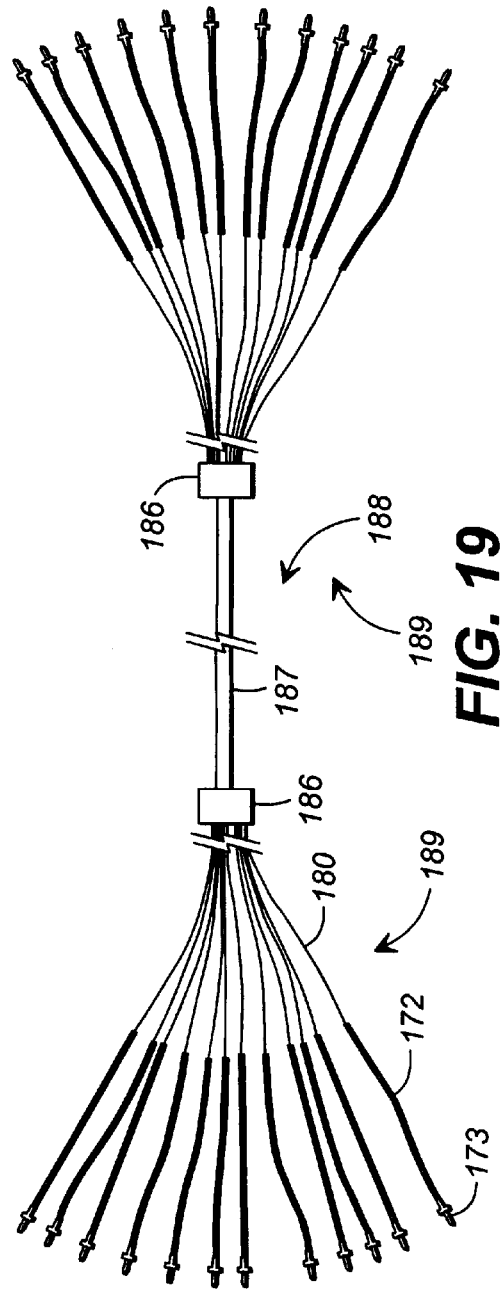
FIG. 19 is a top view of a fiber ribbon cable which has been fanned-out to produce a fan-out assembly.

FIGS. 19–21 show an alternative method to produce the multi-fiber preterminated fan-out assembly 185. This method differs from the method of FIGS. 16–18 by starting with a fiber ribbon cable 187 instead of individual fibers. Tape 186 is applied in two places to a length of the ribbon cable. Both ends of the cable are split to provide a fan-out of individual coated fibers. Each individual fiber 180 is terminated with a length of loose buffer tube 172 and a ferrule/barrel 173, thereby forming a lead assembly 188. Lead assembly 188 is tested for transmission loss, and individual fibers are reterminated as needed. After testing, lead assembly 188 is cut at approximately its center to create two fan-outs 189.

As shown in FIG. 20A, one fan-out 189 is placed into an assembly fixture 191. Lamination tape 184 is placed over pins 193 and the fan-out is placed with its tape 186 as shown and its individual leads dressed to the side of the lamination tape 184. One terminated fiber is dressed at a time, creating a slack loop 194 between the pins 193. An indentation 195 (FIG. 20C) on the inward facing side of each pin 193 prevents the slack loops from springing out from between the pins while the slack loops are being dressed. Each slack loop is provided to compensate for any retermination of a fiber that took place during testing, which would result in the reterminated fiber being shorter than other non-reterminated fibers. Alignment comb 196 provides the needed angle and nest 190 provides the needed length of exposed loose buffer tube 172. A mating lamination tape 184 is placed over the dressed fibers and pins 193, thereby producing a robust lamination to constrain and protect the coated fibers. The twelve terminations 173 are then installed into 12-wide jack assembly 108 and the fan-out assembly 185 is complete with ribbon cable 187 on one end and jacks on the other. This configuration also accommodates reversing of a jack assembly, as described hereinbefore.

The foregoing description has been presented for purposes of illustration and description. It is not intended to be exhaustive or to limit the invention to the precise forms disclosed. Obvious modifications or variations are possible in light of the above teachings. The embodiments discussed, however, were chosen and described to provide the best illustration of the principles of the invention and its practical application to thereby enable one of ordinary skill in the art to utilize the invention in various embodiments and with various modifications as are suited to the particular use contemplated. For instance, although the embodiments herein have been shown and described as incorporating LC type connectors, the present invention is equally well suited for use with other types of connectors, such as SC, ST, and FC connectors, among others. Additionally, some embodiments of the present invention have been described as incorporating couplings, whereas other embodiments have been described as incorporating jack assemblies; however, all embodiments are considered adaptable for use with either couplings and/or jack assemblies. All such modifications and variations, are within the scope of the invention as determined by the appended claims when interpreted in accordance with the breadth to which they are fairly and legally entitled.

What is claimed is:

1. A patch panel for mounting to a mounting surface for use in connecting optical fiber cables with optical fiber patch cords, said patch panel comprising:
   a plurality of couplings, each of said couplings configured to engage an optical fiber cable, each of said couplings moveable between a patching position and a stowed position,
   in said patching position, each of said couplings configured to receive a patch cord in a first direction such that the patch cord engaging said coupling optically communicates with the optical fiber cable engaged by said coupling,
   in said stowed position, the cable of a patch cord engaging said coupling being directed toward the mounting surface in a second direction, said first direction being different than said second direction.

2. The patch panel of claim 1, wherein said first direction is oriented toward the mounting surface.

3. The patch panel of claim 1, wherein said first direction and said second direction are oriented toward the mounting surface.

4. The patch panel of claim 1, wherein each of said couplings is attached to a bracket assembly, said bracket assembly being rotatable between said stowed position and said patching position.

5. The patch panel of claim 4, wherein said bracket assembly includes a slack tray.

6. The patch panel of claim 5, wherein said slack tray is enclosed within said bracket assembly with a removable lid.

7. The patch panel of claim 5, wherein said slack tray is movable between a retracted position and an extended position such that access can be provided to the interior of said bracket assembly when said slack tray is in the extended position.

8. The patch panel of claim 7, wherein said slack tray includes a protrusion with which said slack tray can be retained in the patch panel.

9. The patch panel of claim 7, wherein said slack tray is moved between its retracted position and its extended position by pivoting about a crank, said crank retaining said slack tray when in the extended position.

10. A patch panel for mounting to a mounting surface for use in connecting optical fiber cables with optical fiber patch cords, said patch panel comprising:
    a back panel configured to mount to a mounting surface;
    first and second bracket assemblies attached to said back panel and oriented in a vertically spaced relationship with each other, said first bracket assembly being oriented above at least a portion of said second bracket assembly, said first and second bracket assemblies each having at least one coupling attached thereto, each of said couplings configured to engage an optical fiber cable, said first and second bracket assemblies each being rotatable between a stowed position and a patching position,
    in said patching position, each of said couplings configured to receive a patch cord in a first direction such that the patch cord optically communicates with an optical fiber cable engaging each of said couplings,
    in said stowed position, the cables of patch cords engaging said couplings being directed toward the mounting surface in a second direction, said first direction being different from said second direction.

11. The patch panel of claim 10, wherein each of said bracket assemblies has a slack tray attached thereto, each of said slack trays being moveable between a retracted position and an extended position such that, in said extended position, access is provided to said jack assemblies for engaging optical fiber cables with and disengaging optical fiber cables from said jack assemblies.

12. The patch panel of claim 11, wherein said first bracket assembly has a first lid and said second bracket assembly has a second lid, said second lid and said second bracket assembly forming a slot when said lid is in a closed position, said slot adapted to engage a protrusion of said slack tray such that engagement of said protrusion and said slot supports said slack tray in said extended position.

13. A method for optically interconnecting optical fibers comprising the steps of:
  providing a first coupling and a second coupling, said couplings oriented in a vertically spaced relationship with each other, said first coupling being moveable between a stowed position and a patching position,
  moving said first coupling from said stowed position to said patching position and engaging said first coupling with an optical fiber patch cord that is received in a first direction; and,
  moving said first coupling from said patching position to said stowed position such that said patch cord is directed in a second direction, said first direction being different from said second direction.

14. The method of claim 13, wherein said couplings are arranged adjacent a mounting surface and said first direction and said second direction are oriented toward the mounting surface.

15. A patch panel for mounting to a mounting surface for use in connecting optical fiber cables with optical fiber patch cords, said patch panel comprising:
  a plurality of jack assemblies, each of said jack assemblies configured to engage an optical fiber cable, each of said jack assemblies movable between a patching position and a stowed position,
  in said patching position, each of said jack assemblies configured to receive a patch cord in a first direction such that the patch cord engaging said jack assembly optically communicates with the optical fiber cable engaged by said jack assembly,
  in said stowed position, the cable of a patch cord engaging said jack assembly being directed toward the mounting surface in a second direction, said first direction being different that said second direction.

16. The patch panel of claim 15, wherein each of said jack assemblies has a plug-receiving cavity formed therein which is configured to engage a patch cord connector of a patch cord in said first direction, said plug-receiving cavity cooperating with inclined surfaces of said jack assembly such that a patch cord connector being directed toward engagement with said plug-receiving cavity in said first direction engages said inclined surfaces and is urged into alignment with said plug-receiving cavity.

17. The patch panel of claim 15, wherein said first direction is oriented away from the mounting surface.

18. The patch panel of claim 15, wherein said second direction is oriented toward the mounting surface.

19. The patch panel of claim 15, wherein each of said jack assemblies is attached to a bracket assembly, said bracket assembly being rotatable between said stowed position and said patching position.

20. The patch panel of claim 19, wherein said bracket assembly has a opening formed therethrough and each of said jack assemblies is selectively mountable to said bracket assembly in a forward-facing configuration and a rear-facing configuration such that in said forward-facing configuration an indication of said forward-facing configuration is viewable through said opening.

21. The patch panel of claim 19, wherein said bracket assembly is selectively retainable in its patching position.

22. The patch panel of claim 21, wherein said bracket assembly is selectively retainable in its patching position by a spring, said spring being attached to said back panel and engaging said bracket assembly.

23. The patch panel of claim 19, wherein said bracket assembly includes a slack tray.

24. The patch panel of claim 23, wherein said slack tray is enclosed within said bracket assembly with a removable cover.

25. The patch panel of claim 15, wherein said bracket assembly includes a comb with which fiber is routed within said bracket assembly.

26. A method for optically interconnecting optical fibers comprising the steps of:
  providing a first jack assembly and a second jack assembly, said jack assemblies oriented in a vertically spaced relationship with each other, said first jack assembly being moveable between a stowed position and a patching position,
  moving said first jack assembly from said stowed position to said patching position and engaging said first jack assembly with an optical fiber patch cord that is received in a first direction; and
  moving said first jack assembly from said patching position to said stowed position such that said patch cord is directed in a second direction, said first direction being different from said second direction.

27. The method of claim 26, wherein said first direction is oriented away from the mounting surface and said second direction is oriented toward the mounting surface.

28. The method of claim 26, further comprising the step of:
  urging the patch cord connector into engagement with said plug-receiving cavity with inclined surfaces of said first coupling.

* * * * *